United States Patent
Lessing et al.

(10) Patent No.: US 11,286,144 B2
(45) Date of Patent: Mar. 29, 2022

(54) SOFT ROBOTIC ACTUATORS FOR POSITIONING, PACKAGING, AND ASSEMBLING

(71) Applicant: Soft Robotics, Inc., Cambridge, MA (US)

(72) Inventors: Joshua Lessing, Brookline, MA (US); Daniel Vincent Harburg, Brighton, MA (US); Sarv Parteek Singh, Cambridge, MA (US); Jeffrey Curhan, Brighton, MA (US)

(73) Assignee: SOFT ROBOTICS, INC., Boston, MA (US)

( * ) Notice: Subject to any disclaimer, the term of this patent is extended or adjusted under 35 U.S.C. 154(b) by 0 days.

(21) Appl. No.: 16/795,762

(22) Filed: Feb. 20, 2020

(65) Prior Publication Data

US 2020/0189895 A1  Jun. 18, 2020

Related U.S. Application Data

(63) Continuation of application No. 15/482,050, filed on Apr. 7, 2017, now Pat. No. 10,597,275.

(Continued)

(51) Int. Cl.
*B25J 9/00* (2006.01)
*B67C 3/00* (2006.01)
(Continued)

(52) U.S. Cl.
CPC ............ *B67C 3/007* (2013.01); *B25J 9/0093* (2013.01); *B25J 9/142* (2013.01); *B25J 9/1612* (2013.01);
(Continued)

(58) Field of Classification Search
CPC ..... B67C 3/007; B67C 3/24; B67C 2003/228; B25J 15/12; B25J 9/142; B25J 9/0093;
(Continued)

(56) References Cited

U.S. PATENT DOCUMENTS 4,784,042 A * 11/1988 Paynter .................... B25J 9/142
414/7
5,156,081 A * 10/1992 Suzumori ................ B25J 15/12
91/525

(Continued)

FOREIGN PATENT DOCUMENTS

JP  H04111792 A  4/1992
JP  H11254373 A  9/1999

(Continued)

OTHER PUBLICATIONS

"Hardware Methods for Onboard Control of Fluidically Actuated Soft Robots," McDonald, Kevin; Ranzani, Tommaso; Frontiers in Robotics and AI, 8, 720702; Aug. 17, 2021. (Year: 2021).*

(Continued)

*Primary Examiner* — Khoi H Tran
*Assistant Examiner* — Jorge O Peche
(74) *Attorney, Agent, or Firm* — Kacvinsky Daisak Bluni PLLC

(57) ABSTRACT

Exemplary embodiments relate to applications for soft robotic actuators in the manufacturing, packaging, and food preparation industries, among others. Methods and systems are disclosed for fixing target objects and/or receptacles using soft robotic actuators, for positioning target objects and/or receptacles, and/or for diverting or sorting objects. By using soft robotic actuators to perform the fixing, positioning, and/or diverting, objects of different sizes and configurations may be manipulated on the same processing (Continued)

line, without the need to reconfigure the line or install new hardware when a new object is received.

16 Claims, 14 Drawing Sheets

Related U.S. Application Data

(60) Provisional application No. 62/319,571, filed on Apr. 7, 2016.

(51) Int. Cl.
| | | |
|---|---|---|
| *B25J 15/12* | (2006.01) | |
| *B25J 9/14* | (2006.01) | |
| *B25J 9/16* | (2006.01) | |
| *B25J 15/00* | (2006.01) | |
| *B65C 3/26* | (2006.01) | |
| *B67B 3/02* | (2006.01) | |
| *B67C 3/24* | (2006.01) | |
| *B67C 3/22* | (2006.01) | |

(52) U.S. Cl.
CPC ........... *B25J 15/0023* (2013.01); *B25J 15/12* (2013.01); *B65C 3/26* (2013.01); *B67B 3/02* (2013.01); *B67C 3/24* (2013.01); *B67C 2003/228* (2013.01); *G05B 2219/39466* (2013.01); *G05B 2219/39554* (2013.01); *G05B 2219/40253* (2013.01)

(58) Field of Classification Search
CPC ....... B25J 9/1612; B25J 15/0023; B65C 3/26; B67B 3/02; G05B 2219/39554; G05B 2219/40253; G05B 2219/39466
See application file for complete search history.

(56) References Cited

U.S. PATENT DOCUMENTS

| | | | | |
|---|---|---|---|---|
| 6,178,872 | B1* | 1/2001 | Schulz | B25J 9/142 |
| | | | | 92/92 |
| 6,267,422 | B1* | 7/2001 | Alba | B66C 1/66 |
| | | | | 294/215 |
| 9,782,902 | B1* | 10/2017 | Kim | B25J 15/0009 |
| 10,089,575 | B1* | 10/2018 | Redmon | G06N 3/049 |
| 10,922,154 | B1* | 2/2021 | Allison | G06F 9/542 |
| 2002/0157388 | A1* | 10/2002 | Seto | F15B 15/18 |
| | | | | 60/325 |
| 2005/0166413 | A1* | 8/2005 | Crampton | B25J 13/088 |
| | | | | 33/503 |
| 2005/0218679 | A1* | 10/2005 | Yokoyama | B25J 15/10 |
| | | | | 294/99.1 |
| 2008/0131254 | A1* | 6/2008 | Cope | G01N 1/04 |
| | | | | 414/754 |
| 2010/0228397 | A1* | 9/2010 | Weber | B25J 13/06 |
| | | | | 700/264 |
| 2013/0152724 | A1* | 6/2013 | Mozeika | B25J 9/0015 |
| | | | | 74/490.05 |
| 2014/0109560 | A1* | 4/2014 | Ilievski | B25J 9/142 |
| | | | | 60/327 |
| 2015/0314440 | A1* | 11/2015 | Parker | B25J 9/1689 |
| | | | | 700/253 |
| 2016/0075036 | A1* | 3/2016 | Lessing | B25J 15/0085 |
| | | | | 361/234 |
| 2016/0114482 | A1* | 4/2016 | Lessing | B25J 15/0616 |
| | | | | 606/130 |
| 2016/0135799 | A1* | 5/2016 | Lessing | A61B 17/02 |
| | | | | 600/207 |
| 2016/0136820 | A1* | 5/2016 | Lessing | B25J 15/12 |
| | | | | 294/208 |
| 2016/0167227 | A1* | 6/2016 | Wellman | B25J 9/1612 |
| | | | | 700/259 |
| 2016/0279803 | A1* | 9/2016 | Lessing | B32B 5/26 |
| 2016/0361821 | A1* | 12/2016 | Lessing | B25J 15/0061 |
| 2016/0375590 | A1* | 12/2016 | Lessing | B25J 15/12 |
| | | | | 294/196 |
| 2017/0028566 | A1* | 2/2017 | Knopf | B25J 15/0023 |
| 2017/0036355 | A1* | 2/2017 | Lessing | B25J 9/142 |
| 2017/0080566 | A1* | 3/2017 | Stubbs | B25J 9/163 |
| 2017/0203443 | A1* | 7/2017 | Lessing | B25J 15/0616 |
| 2017/0291806 | A1* | 10/2017 | Lessing | B25J 9/1612 |
| 2017/0341238 | A1* | 11/2017 | Lessing | B25J 9/142 |
| 2018/0056514 | A1* | 3/2018 | Katou | B25J 9/0093 |
| 2018/0056526 | A1* | 3/2018 | Lynn | B25J 18/06 |
| 2018/0169869 | A1* | 6/2018 | Chiappetta | B25J 15/0023 |
| 2018/0281201 | A1* | 10/2018 | Rosenstein | B25J 9/1656 |
| 2018/0297214 | A1* | 10/2018 | Lessing | A61H 3/00 |
| 2018/0311829 | A1* | 11/2018 | Curhan | B25J 15/0033 |
| 2019/0030714 | A1* | 1/2019 | Knopf | F15B 13/0402 |
| 2019/0039838 | A1* | 2/2019 | Curhan | B25J 15/0014 |
| 2019/0047156 | A1* | 2/2019 | Curhan | B25J 13/085 |
| 2019/0061170 | A1* | 2/2019 | Curhan | B25J 15/103 |
| 2019/0084165 | A1* | 3/2019 | Curhan | B25J 9/123 |
| 2019/0111571 | A1* | 4/2019 | Curhan | B25J 11/0045 |
| 2019/0145455 | A1* | 5/2019 | Curhan | F16B 33/004 |
| | | | | 411/371.1 |
| 2019/0168382 | A1* | 6/2019 | Lessing | F15B 15/103 |
| 2019/0193283 | A1* | 6/2019 | Lessing | B25J 9/142 |
| 2019/0240843 | A1* | 8/2019 | Pan | B25J 9/1697 |
| 2020/0189895 | A1* | 6/2020 | Lessing | B25J 15/12 |
| 2020/0323140 | A1* | 10/2020 | Gielis | A01D 46/24 |
| 2020/0376656 | A1* | 12/2020 | Berkowitz | B25J 17/02 |
| 2021/0089040 | A1* | 3/2021 | Ebrahimi Afrouzi | |
| | | | | A47L 9/2894 |

FOREIGN PATENT DOCUMENTS

| | | | |
|---|---|---|---|
| JP | 2010110846 A | | 5/2010 |
| JP | 2015085479 A | | 5/2015 |
| JP | 2019517393 | * | 6/2019 |
| WO | 2013186280 A1 | | 12/2013 |
| WO | WO 2017177126 | * | 10/2017 |

OTHER PUBLICATIONS

"Water pipe robot utilizing soft inflatable actuators;" Wade Adams; Saivimal Sridar; Carly M. Thalman; Bryce Copenhaver; Hassan Elsaad; Panagiotis Polygerinos; 2018 IEEE International Conference on Soft Robotics (RoboSoft) (pp. 321-326); Apr. 1, 2018. (Year: 2018).*

"Morphological and Embedded Computation in a Self-contained Soft Robotic Hand;" Farrow, Nicholas; Li, Yang; Correll, Nikolaus; Cornell University, May 2, 2016 (Year: 2016).*

* cited by examiner

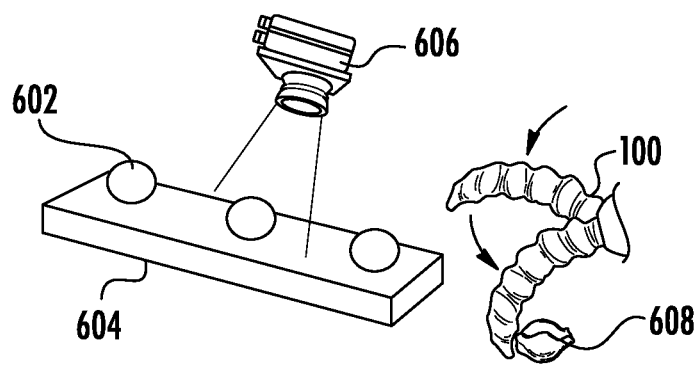
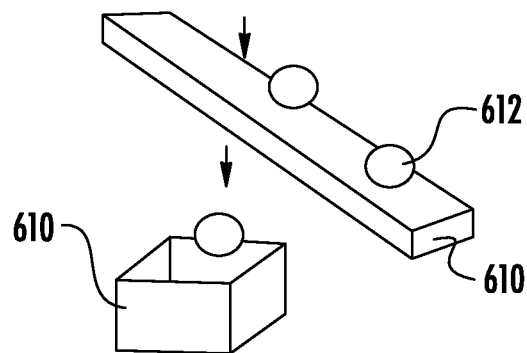
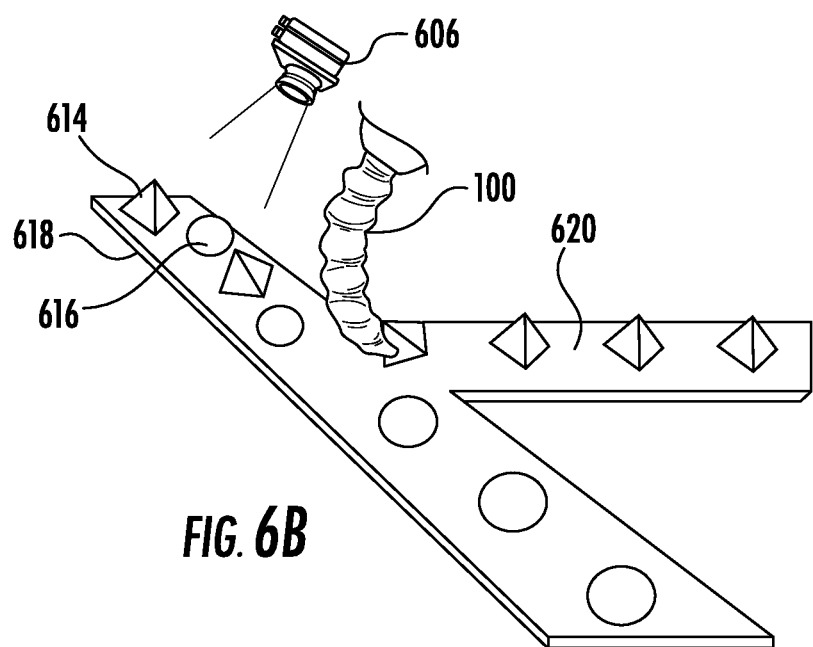
FIG. 6A
FIG. 6B

SOFT ROBOTIC ACTUATORS FOR POSITIONING, PACKAGING, AND ASSEMBLING

RELATED APPLICATIONS

The present application is a continuation application to U.S. application Ser. No. 15/482,050, filed Apr. 7, 2017, which claims priority to U.S. Provisional Application Ser. No. 62/319,571, filed on Apr. 7, 2016 and entitled "Soft Robotic Actuators for Positioning, Packaging, and Assembling." The contents of the aforementioned application are incorporated herein by reference.

BACKGROUND

Traditionally, fixturing, positioning and redirecting devices employed in manufacturing, packaging, and food preparation have predominantly employed hard components for interacting with the object to be gripped and/or manipulated. Hard fixturing, positioning and redirecting devices employ structures for interacting with an object of interest that are relatively non-compliant. Because hard structures do not readily conform to the target being grasped, they can be limited in some respects when employed in connection with certain applications.

SUMMARY

Soft robotic grippers provide new opportunities in manipulating target objects for manufacturing, packaging, food preparation, and other related tasks. Exemplary embodiments provide methods and systems for fixing target objects and/or receptacles using soft robotic actuators, for positioning target objects and/or receptacles, and/or for diverting or sorting objects. Unless otherwise noted, it is contemplated that the procedures described below may be used alone or in any combination. Features described in connection with one embodiment may be used in connection with another, different embodiment, unless it is noted that the embodiments are incompatible with each other.

According to an embodiment, a method may include providing a target object to an input location, the input location being proximal to a soft robotic actuator, the soft robotic actuator comprising an elastomeric body having a reservoir and configured to be inflated by supplying an inflation fluid to the reservoir. Among other possibilities, the target object may be a bottle, produce, or a receptacle for receiving a plurality of objects.

The method may further include transmitting a first control signal to a controller associated with the soft robotic actuator, the first control signal comprising a first command to inflate the soft robotic actuator. In response to the first command, the system may cause inflation fluid to be provided to the soft robotic actuator, such as by operating a compressor, piston, and/or valve for supplying the inflation fluid to the reservoir.

The method may further include fixing the target object at the input location using the soft robotic actuator. For example, the target object may be pinned between the soft robotic actuator and another soft robotic actuator, the soft robotic actuator and a metal plate or other solid surface, etc.

The method may further include performing an operation on the target object, and determining that the operation has ended. For example, if the target object is a bottle, the operation may involve filling the bottle, labeling the bottle, washing the bottle, and/or capping the bottle. If the target object is an article of produce, the operation may include slicing the produce at a predetermined location. Any target may also or alternatively be inspected and/or repaired while fixed in place.

In some embodiments, the target object may be a first receptacle for receiving a plurality of objects to be packaged, the first receptacle in a first configuration and the soft robotic actuator supporting the first receptacle in the first configuration. In these embodiments, the method may further involve providing a second receptacle in a second configuration different than the first configuration, and fixing the second receptacle in place using the same soft robotic actuator as was used to fix the first receptacle.

The method may further include transmitting a second control signal to the controller, the second control signal comprising a second command to deflate the soft robotic actuator. Upon deflation, the target object may be provided to an output location.

The above-described method may be performed at a fixturing station. The fixturing station may include an input location for receiving a target object. In some embodiments, the target object may be provided to the input location (and/or the below-described output location) using one or more conveyor belts.

The fixturing location may further include a soft robotic actuator located within reach of the input location, the soft robotic actuator comprising an elastomeric body having a reservoir and configured to be inflated by supplying an inflation fluid to the reservoir. The soft robotic actuator may be a linearly-extending actuator. In some embodiments, the fixturing station may include a mounting plate comprising a plurality of holes for securing the soft robotic actuator and for supplying the inflation fluid to the soft robotic actuator. The actuator may be fixed above or to the side of the input location, or may be movable with respect to the input location (e.g., mounted to a conveyor).

In some embodiments, the fixturing station may include a relatively non-deformable plate positioned with respect to the input location so that the soft robotic actuator, when actuated, pins the target object to the plate.

The fixturing station may further include a controller programmed with instructions that, when executed by one or more processors, cause the one or more processors to: cause the inflation fluid to be delivered to the soft robotic actuator to fix the target object at the input location; cause an operation to be performed on the target object; determine that the operation has ended; and cause the soft robotic actuator to be deflated.

The fixturing station may further include an output location for receiving the target object after the operation is performed.

Other embodiments may provide a method for positioning, moving, or otherwise manipulating a target object. The method may include providing a target object to an input location, the input location being proximal to a soft robotic actuator, the soft robotic actuator comprising an elastomeric body having a reservoir and configured to be inflated by supplying an inflation fluid to the reservoir.

The method may further include identifying that the target object is not in a predetermined target location. For example, the target object may be provided to the input location on a conveyor belt, and the predetermined target location may be a center of the conveyor belt or a side of the conveyor belt.

The method may further include transmitting a first control signal to a controller associated with the soft robotic actuator, the first control signal comprising a first command to inflate the soft robotic actuator.

The method may further include moving the target object to the predetermined target location using the soft robotic actuator. For example, the target object may be moved, by the inflation of the actuator, to the side or center of a conveyor belt. In another embodiment, the target object may be a flap of a box, and the actuator may hold the flap in a configuration that allows a clear path to an opening of the box.

The above-described method may be performed at a positioning station. The positioning station may include an input location for receiving a target object. The target object may be, for example, a food item such as a unit of produce, a tray or platform for holding objects, a box, etc.

The positioning location may further include a soft robotic actuator located within reach of the input location, the soft robotic actuator comprising an elastomeric body having a reservoir and configured to be inflated by supplying an inflation fluid to the reservoir. The soft robotic actuator may be mounted to a gantry or set of rails above the input location so that the soft robotic actuator is movable with respect to the input location.

In some embodiments, the target object may be provided to the input location (and/or the below-described output location) using one or more conveyor belts. The soft actuator may be mounted to the conveyor belt and may hold the object. When it is determined that the target object is not provided in the predetermined location, the soft robotic actuator may be inflated or deflated to move the target object into the predetermined location.

In some embodiments, the conveyor belts may be provided with one or more protrusions for separating target objects from each other. For example, the protrusions may take the form of one or more additional soft robotic actuators, such as linear actuators, that may be inflated to varying degrees to change the amount of space available between the actuators to thereby accommodate items of different sizes or shapes of target objects. Alternatively or in addition to the protrusions, the conveyor belt may contain one or more soft robotic actuators configured to partially encompass or form a semispherical container for an object.

In further embodiments, the belt may be a flighted belt for lifting items into the air (e.g., in order to drop them into a box or container). The flighted belt may include protrusions made up of soft robotic actuators.

In some embodiments, the positioning station may include a relatively non-deformable plate positioned to a side of the conveyor belt and with respect to the input location so that the soft robotic actuator, when actuated, pins the target object to the plate in a predetermined configuration. Upon moving to an output location, the plate may give way to a cutting implement to cut the target object at a predetermined location on the target object.

The positioning station may further include a controller programmed with instructions that, when executed by one or more processors, cause the one or more processors to: cause the inflation fluid to be delivered to the soft robotic actuator to move the target object at the input location to the predetermined location and to cause the soft robotic actuator to be deflated after moving the target object to the predetermined location. In some embodiments, the soft robotic actuator may pin the flaps of a box in a configuration that allows a clear path into an opening of the box.

The positioning station may further include an output location for receiving the target object after the moving is performed.

In further embodiments, which may be used as an alternative to or in conjunction with the embodiments described above, a method of diverting a target object is provided.

The method may include sensing a target object at an input location with a sensor. For example, the sensor may be a camera, and sensing the target object may involve imaging the target object with the camera. Computer vision and/or image analysis may be applied to identify one or more characteristics of the target object.

The method may further include determining if the target object is of a first type or a second type. For example, the first type may be a normal type and second type may be a defective type. Alternatively or in addition, the first type may have a characteristic having a first value and the second type may have a characteristic having a second value different than the first value.

The method may further include diverting the target object to a diversion location if the target object is of the second type. The diverting may include: providing the target object to a diversion location accessible to a soft robotic actuator, the soft robotic actuator comprising an elastomeric body having a reservoir, and configured to be inflated by supplying an inflation fluid to the reservoir, and transmitting a control signal to a controller associated with the soft robotic actuator, the control signal comprising a command to inflate the soft robotic actuator. For example, the diverting location may be a receptacle, or a second conveyor belt different than a first conveyor belt at the input location.

Alternatively, if the target object is of the first type, the method may include refraining from diverting the target object to the diversion location. For example, a system may allow the target object to continue along a first conveyor belt associated with the input location, and/or may allow the target object to fall from such a first conveyor belt to a second conveyor belt.

The above-described method may be performed at a diversion station. The diversion station may include an input location for receiving a target object. In some embodiments, the target object may be provided to the input location (and/or the below-described output location) using one or more conveyor belts.

The diversion station may include a sensor, such as a camera, for sensing the target object at the input location.

The diversion location may further include a soft robotic actuator located within reach of the input location, the soft robotic actuator comprising an elastomeric body having a reservoir and configured to be inflated by supplying an inflation fluid to the reservoir. The soft robotic actuator may be a linearly-extending actuator. The actuator may be fixed above or to the side of the input location, or may be movable with respect to the input location (e.g., mounted to a conveyor).

The diversion station may further include a controller programmed with instructions that, when executed by one or more processors, cause the one or more processors to: determine if the target object is of a first type or a second type; divert the target object to a diversion location if the target object is of the second type by causing inflation fluid to be delivered to the soft robotic actuator; or refrain from diverting the target object to the diversion location when the target object is of the firs type.

The diverting station may further include a diversion location for receiving the target object in the case that the target object is diverted, and may include an output location for receiving the target object if the target object is not diverted. For example, the diversion location may be a box, bin, or other receptacle, and/or may be a second conveyor belt different than a first conveyor belt associated with the input location. The output location may be a first conveyor belt that is the same as a conveyor belt associated with the input location, or may be a second conveyor belt (e.g., a second conveyor belt positioned below the first conveyor belt so that undiverted target objects are permitted to drop from the first conveyor belt to the second conveyor belt).

As noted above, it is contemplated that these embodiments may be used separately or in combination with each other. For example, the fixturing, positioning, and diverting techniques may be employed in dedicated systems. Alternatively, a single system may perform a combination of techniques, such as positioning a target object at a predetermined location, fixing the target object to perform an operation, and diverting the target object to an appropriate output or diversion location. Techniques applicable to one type of system may equally be applied to other types of systems (such as, but not limited to, imaging objects using a sensor and detecting object characteristics at any or all of the fixturing, positioning, and/or diverting stations).

These and other embodiments are described in more detail below with reference to the attached drawings.

BRIEF DESCRIPTION OF THE DRAWINGS

FIGS. 6A-6B depict various examples of diversion stations according to exemplary embodiments;

DETAILED DESCRIPTION OF THE PREFERRED EMBODIMENTS

Figure 1A:
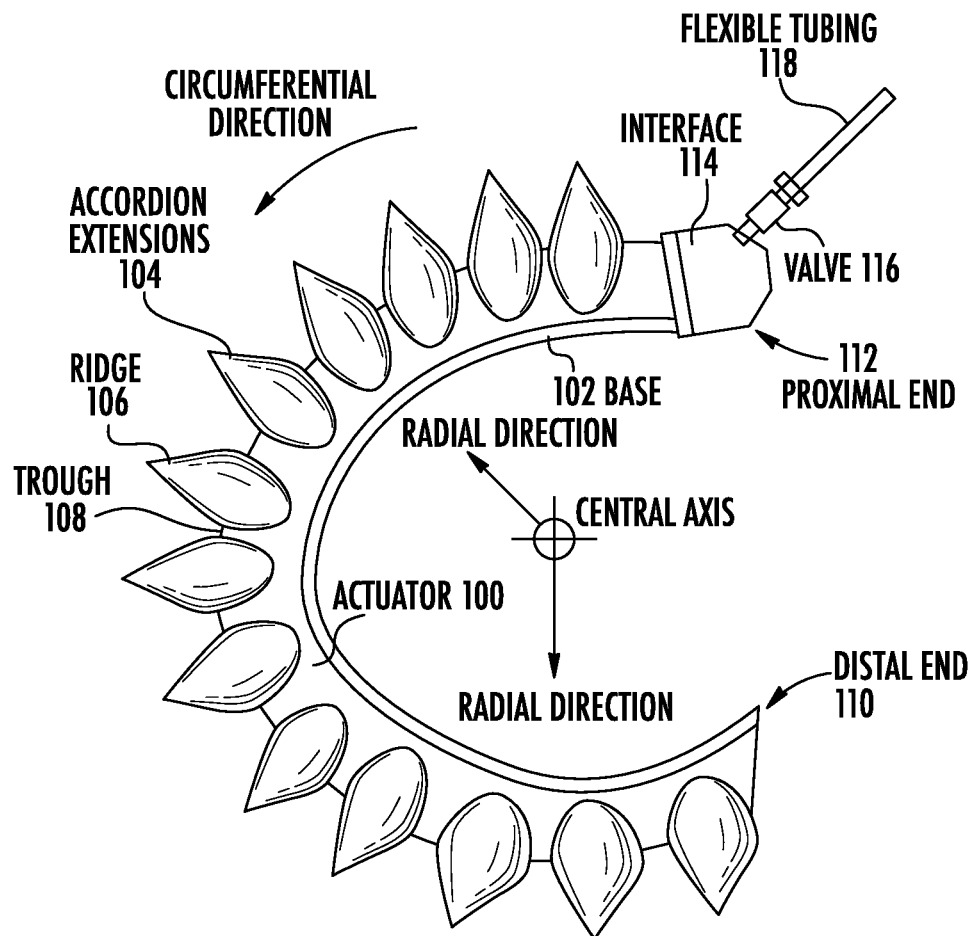
FIGS. 1A-1D depict an exemplary soft robotic actuator system.

The present invention will now be described more with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Background on Soft Robotic

Conventional robotic actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, coated fabric, or thin walls of plastic arranged in an accordion structure that is configured to unfold, stretch, twist, bend, extend and/or contract under pressure, or other suitable relatively soft materials. As an alternative or in addition to accordion structures, other types or configurations of soft actuators employing elastomeric materials may be utilized. They may be created, for example, by molding bonding one or more pieces of the elastomeric material into a desired shape. Alternatively or in addition, different pieces of elastomeric material may be thermally bonded, or sewn. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Still further, soft actuators are adaptive, and accordingly a single fixture can grip multiple kinds of objects. Because the outer surfaces of soft actuators are relatively delicate, they can serve in roles such as redirectors for easily bruised or damaged items (e.g., tomatoes) whereas hard fixtures might be limited to manipulating more robust items (e.g., brass valves).

Furthermore, soft actuators will typically not mark the surface being gripped. Typically, when an easily-marked surface (e.g., a veneer) will be gripped by a hard fixture, a protective coating or film may be applied to prevent the part from being marked; this increases the cost of manufacturing. With a soft actuator, this step may be omitted and the part may be protected without a special coating or film.

Moreover, soft robotic actuators allow for types of motions or combinations of motions (including bending, twisting, extending, and contracting) that can be difficult to achieve with traditional hard robotic actuators.

Figure 1B:
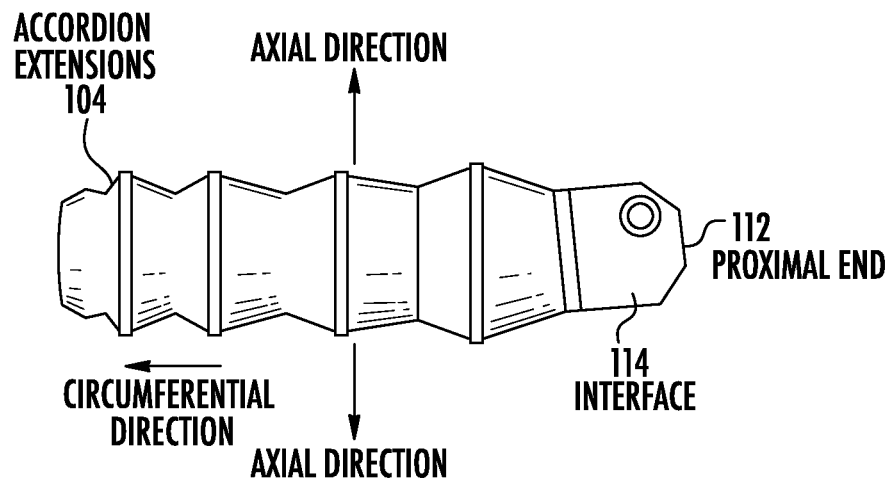
Figure 1C:
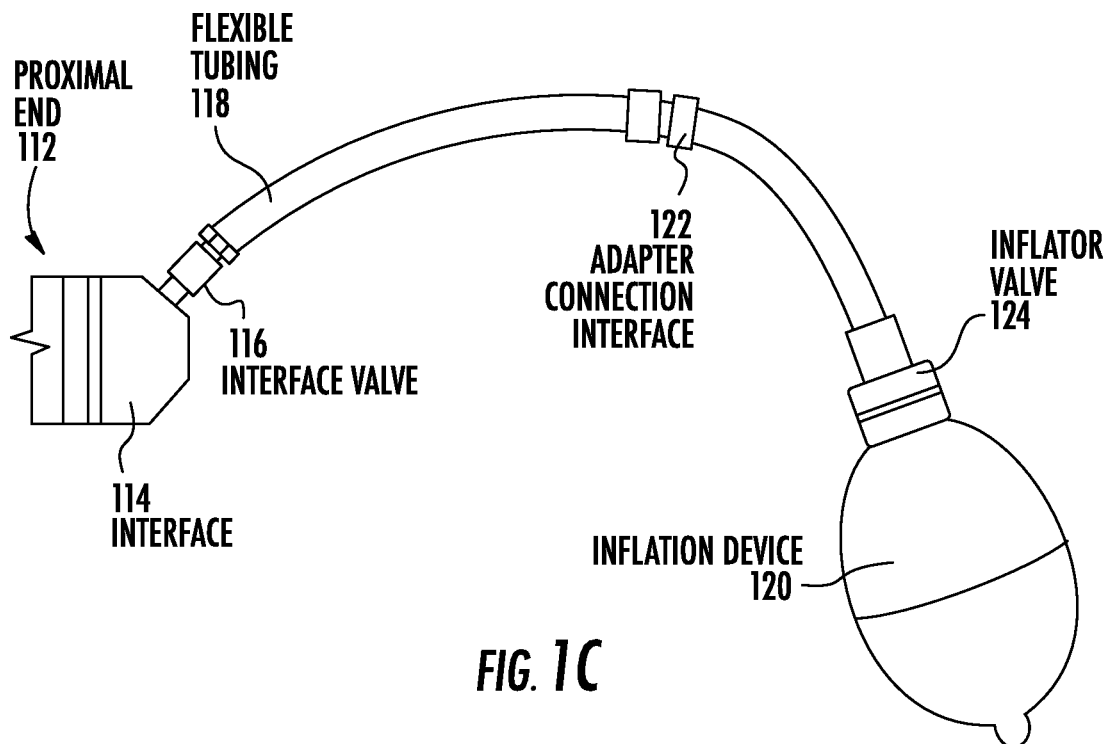
Figure 1D:
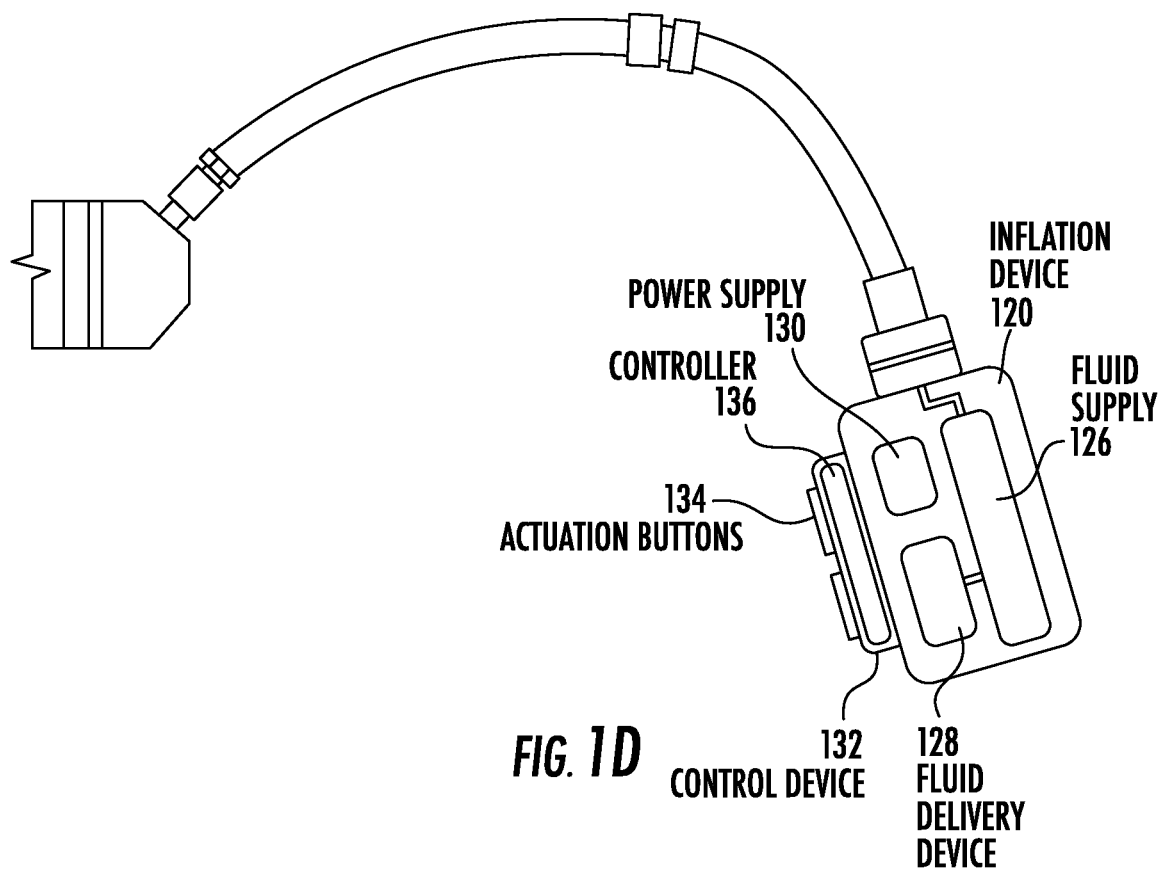

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, or saline. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100, or the pressure may be set to a predetermined amount (in either case, the predetermined amount may correspond to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated, and help to define the shape of the actuator 100 when in an inflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the actuator to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts of the actuator. The interface 114 may be made of a medically safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may include an opening for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch). The control device 132 may include a controller 136 for sending a control signal to the fluid delivery device 128 to cause the fluid delivery device 128 to supply inflation fluid to, or withdraw inflation fluid from, the actuator 100. Alternatively or in addition, the control device 132 may perform automatic control of inflation or deflation, may collect diagnostic, sensor, or other information from one or more systems monitoring the gripper, and/or may accept remote commands from a user device and/or remote controller.

Exemplary Methods and Systems for Fixing Target Objects at an Input Location Using Soft Robotic Actuators Some exemplary embodiments described herein provide techniques and apparatuses for fixing a target object at a particular location. As used herein, fixturing or fixing an object refers to securing the object in a particular (predetermined) location and/or in a particular (predetermined) configuration in order to perform an operation on the object.

These techniques may be useful in a variety of scenarios, such as: fixing a bottle or other receptacle to be cleaned, filled, sealed, or labeled; fixing a food item to be sliced or cut; fixing an article to be ground, cut, additively manufactured, or otherwise operated upon; fixing a receptacle to receive one or more products for packaging; fixing an object for inspection or repair; and many other applications.

Figure 2A:
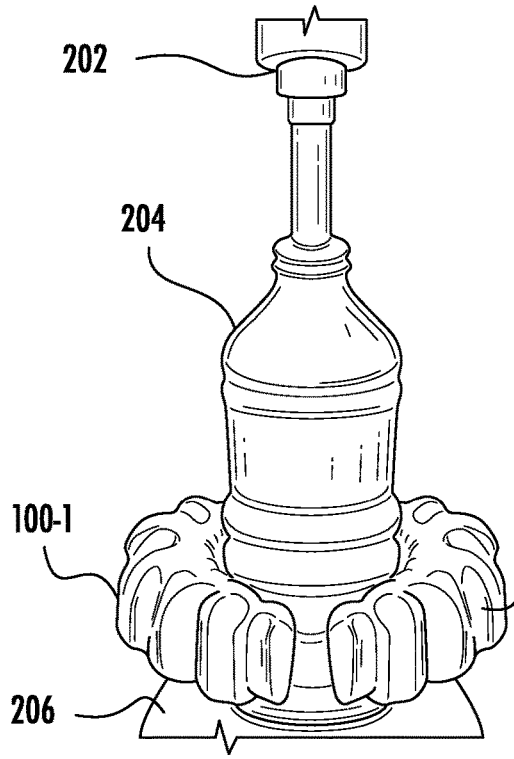
FIGS. 2A-2M depict various examples of fixturing stations according to exemplary embodiments.
Figure 2B:
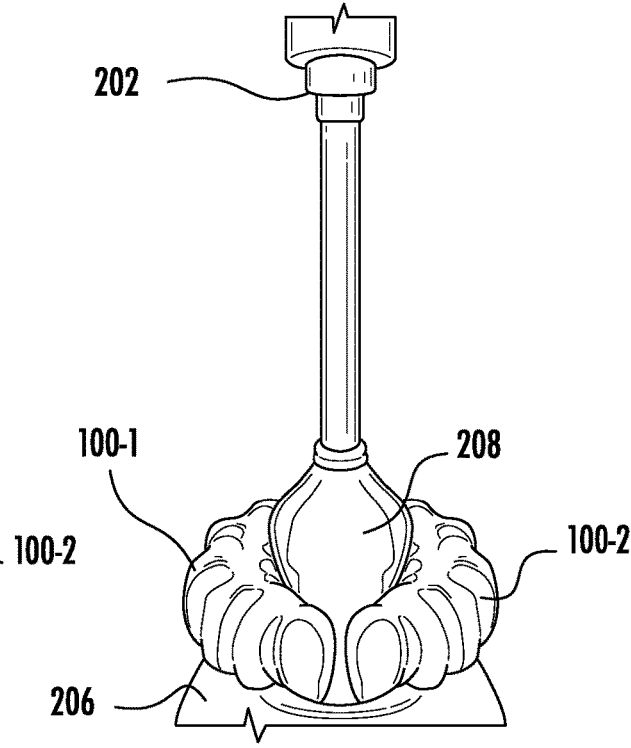

One exemplary fixturing station is depicted in FIGS. 2A-2B. In this example, two soft actuators 100-1, 100-2 are used to fix a bottle at an input location so that the bottle may be filled by a filling machine 202. Although FIGS. 2A-2B depict an example of fixing a bottle at a particular location, one of ordinary skill in the art will understand that any suitable object may be fixed by the actuators 100-1, 100-2. Moreover, although FIGS. 2A-2B depict an example employing two actuators 100-i, more or fewer actuators may be employed depending on the application.

For example, one or more linearly-extending accordion actuators may be used as bumpers to center an item between them, when inflated. In the case of multiple actuators, the actuators may, for instance, pin the item between themselves. In the case of a single actuator, the actuator may pin a bottle or other item up against a hard target, such as a metal plate or curved sheet of metal. In one example, for instance, the second actuator 100-2 may be replaced with a relatively non-compliant plate, such as a metal or hard plastic plate. Accordingly, when actuated the first actuator 100-1 may pin the target object to the plate.

Figure 2C:
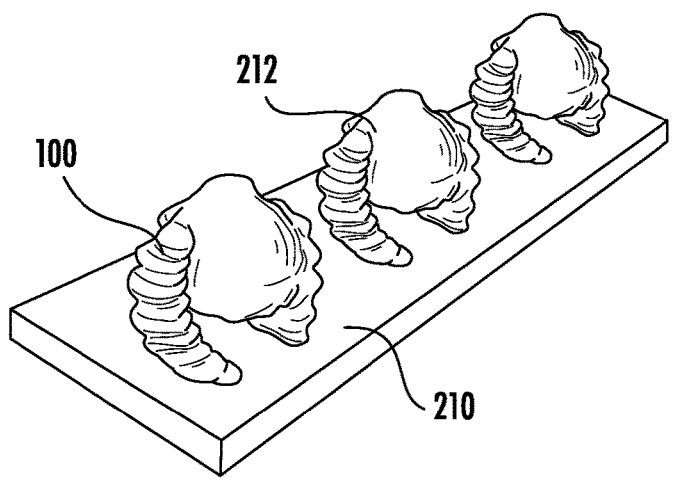
Figure 2D:
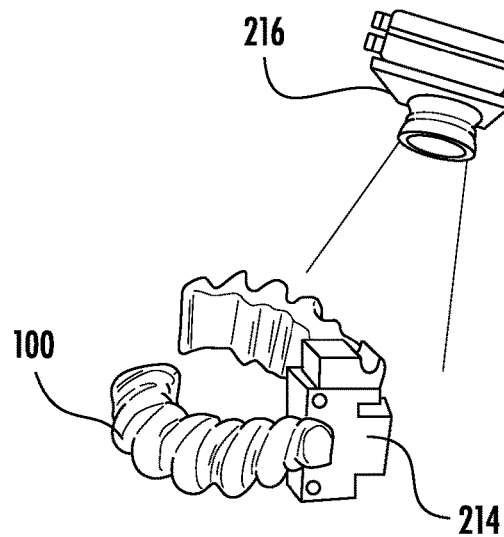
Figure 2E:
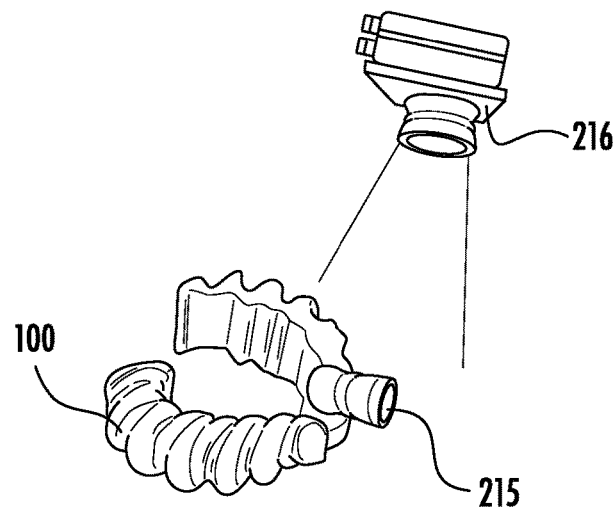
Figure 2F:
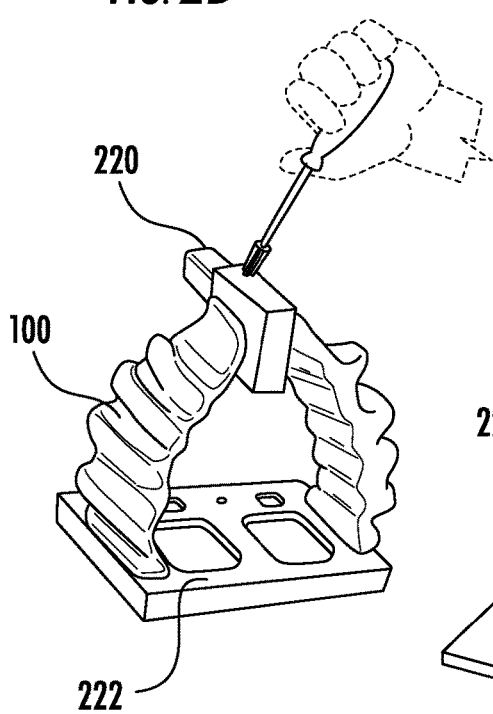
Figure 2G:
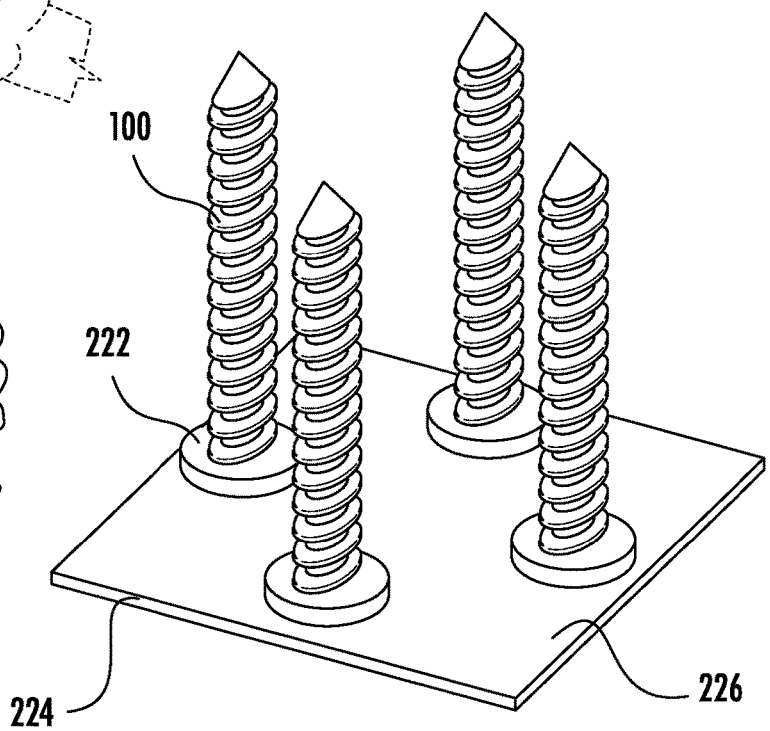
Figure 2I:
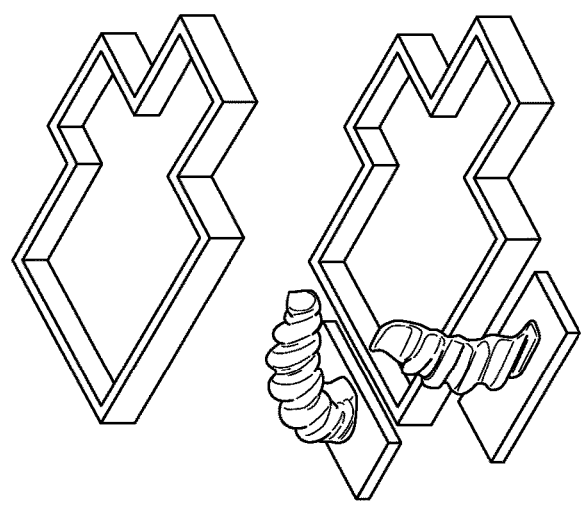
Figure 2K:
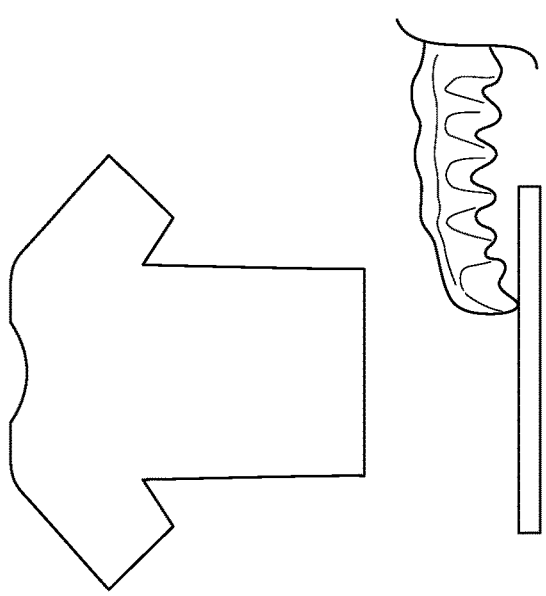
Figure 2H:
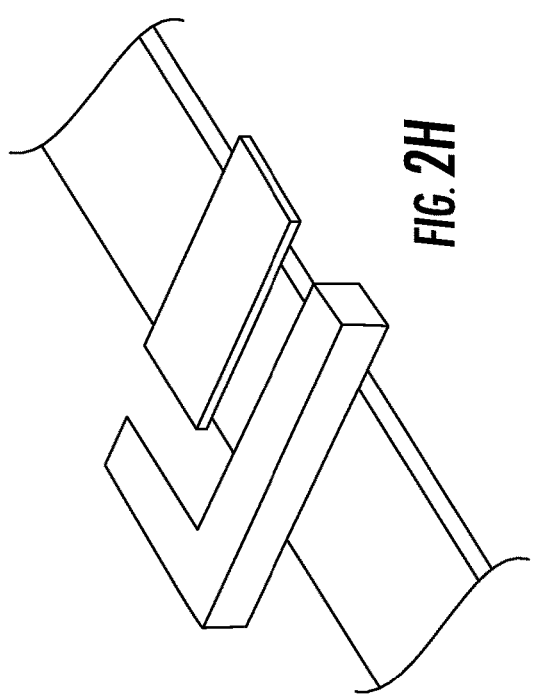

For instance, as shown in FIG. 2H (top), an L-shaped hard-stop may be lowered onto a conveyor belt at a given location. The interior corner may be provided in a precise location at which an incoming object may be fixed for performing an operation. One or more actuators (in this example, two actuators provided opposite the sides of the L) may deploy to push the target item into the corner, thereby fixing the target object against the L-shaped hard-stop.

FIG. 2H (top and bottom) also depict a situation in which one of the actuators is provided in-line with the conveyor (which, in this case, is in the form of two rails separated by a certain distance). In this example, the actuator is provided below the conveyor and retracted (e.g., by being negatively inflated) so that the actuator is out of the way when an item passes over it on the conveyor. Subsequently, the actuator may be inflated to push the target object in a direction parallel to the motion of the conveyor.

After an operation is performed on the target object, the actuators may be deflated and the L-shaped hard stop may be withdrawn.

Because the actuator(s) 100-i are adaptable, the same set of soft actuators may be used to hold a variety of different sizes and shapes of target objects. For example, in FIG. 2A, the soft actuators 100-1, 100-2 hold a relatively large bottle 204 having a first shape, whereas in FIG. 2B the same soft actuators 100-1, 100-2 hold a relatively small bottle 208 having a second, different shape.

The location in space at which the actuators hold the target object is referred to herein as an input location. The target object(s) may be delivered to the input location using any suitable device; for example, FIGS. 2A-2B depict the target objects being delivered to the input location via a conveyor belt or other surface 206. In this example, the actuators 100-1, 100-2 may be at a fixed location, e.g. by being fixed above, to the side, or below the input location. Alternatively or in addition, the actuators 100-1, 100-2 may be movable with respect to the input location, such as by being mounted on a gantry or conveyor belt, which may move to the target object and/or may move with the target object. The spacing or configuration (number of active actuators, layout, etc.) of the actuators may be fixed or may be adjusted dynamically to accommodate items of different shape, weight, and size.

In some embodiments, the input location may be a recess or depression configured to receive the target object, as shown for example in FIG. 2I. Such embodiments may be particularly well-suited to objects having irregular shapes, where one or more actuators may secure the target object from the top while the object is partially encompassed in the depression. In further embodiments, a soft actuator provided in the depression under the object may be actuated to remove the object from the depression by "kicking" the object upwards and forwards.

The actuators may be configured to grasp the target object at a predetermined location on the target object. Furthermore, the actuators may be configured to hold the target object in a predetermined position, which may involve rotating and/or translating the object once grasped.

This same concept may be applied to other devices requiring that an object be held in a fixed location and/or configuration, such as labeling machines (where the actuators may grip the bottle at a predetermined location, such as the top, and the labeling machine may apply labels to the rest of the body), capping machines (where the actuator may hold the bottle at a particular location such as the middle or base and a machine may push or rotate a cap onto it), or a bottle washing machine (where the actuator may grip the bottle at a section and a washing solution may be applied onto it or in side of it via the washing machine).

More generally, soft actuators may be used to secure parts of varying sizes, weights, and shapes for a number of other operations to be performed in manufacturing, packaging, and other fields. Further examples include gluing a work part, adding semi-permanent fasteners like screws to a work part, adding o-rings to a work part, hand lapping, laser marking, engraving, fitting with parts/assembling, polishing, sanding, painting, powder coating, anodizing, cutting, sewing, receiving a surface treatment etc. A fixturing station may be provided with one or more actuators at the input location for fixing the target object in place while the operation is performed. A controller may receive a control signal instructing the controller to inflate the actuator(s), and in response may cause the actuators to be fully or partially filled with the inflation fluid. This may serve to fix the target object in place while the operation is performed. When the operation is complete, the controller may receive a second control signal instructing the controller to deflate the actuator(s), and in response may cause the actuators to be fully or partially deflate (e.g., removing some or all of the inflation fluid). The target object may then be moved to an output location (e.g., a location further along a conveyor system, or a receptacle for receiving finished products) and a new target object may be moved into the input location.

In yet another example, two opposing actuators 100 may hold an article 212, such as a food item (e.g., a piece of broccoli, lettuce, or a similar item) in a particular configuration, as shown in FIG. 2C. The actuators 100 may hold the article 212 in a particular configuration; in the example depicted in FIG. 2C, Brussels sprouts are held stem-up for cutting. It is noted that, in this image, the base 210 on which the actuators are mounted may be a static table or a moving conveyor belt, among other possibilities. Moreover, the conveyor may be in any orientation so that the held item may be above, below, or to the side of the conveyor in order to present the item to a processing machine (e.g., a cutter, a coater, a washer, etc.) in any orientation suitable for a given application.

Figure 2J:
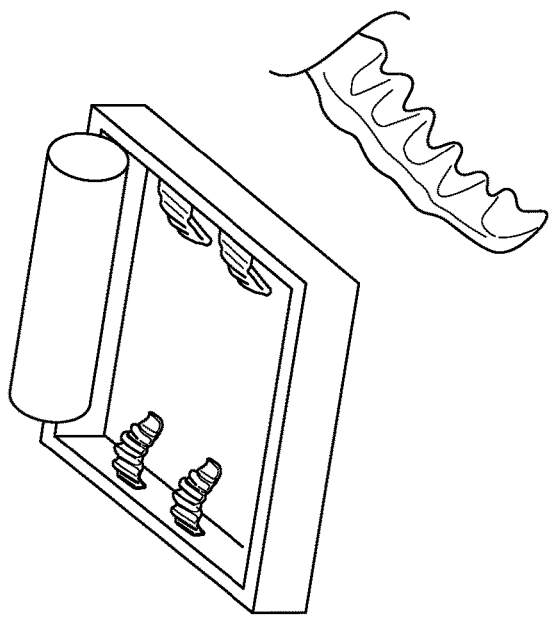

Soft actuators may also hold relatively flat objects, such as paper or cloth, under tension for cutting, scanning, marking, inspecting, folding, etc. Examples of fixturing stations for such purposes are shown in FIGS. 2J-2K. In these examples, two or more actuators may be provided in locations that, when actuated, cause the flat object to be pulled tight. After a soft actuator makes contact with the object, the actuator may be restricted from continuing to move in certain directions (e.g., into a hard stop). Thus, continued inflation may cause the actuator to attempt to continue to curl, which pulls the item back towards the base of the actuator (as shown, e.g., at the bottom of FIGS. 2J and 2K). These techniques may be employed with other fixturing methods described herein.

FIGS. 2D-2E depict further examples in which soft actuators 100 act as adaptive fixtures holding a target object 214, 218 for a visual inspection device 216 at a factory. In practice, any suitable sensor may be used in place of the visual inspection device 216. Because the soft actuators 100 are relatively adaptable, the soft actuators 100 may be used to fixture and inspect (e.g., visually, spectroscopically, etc.) parts of different sizes, weights and shapes with none or minimal reconfiguration on the tool holding the actuators 100. As in the above examples, the actuators 100 may be statically mounted at an inspection machine, or may be moving on a conveyor belt that travels through an inspection machine.

FIG. 2F depicts an example in which soft actuators 100 act as a set of "helping hands" for gripping a target object 220. These helping hands may be mounted on a collaborative robot to assist (e.g., a human or a robot) in an assembly process. Due to the compliant nature of soft robotic actuators, such a setup may be well-suited to holding delicate or easily blemishable items during assembly. One example of such an application is a vehicle dash panel finished with an easily blemishable veneer—the exemplary soft fixturing device may hold the dash panel while a human or another robot mounts the dashboard to the vehicle or as a human or another robot attaches other components to the panel like chrome plated plastic accessories.

Figure 2L:
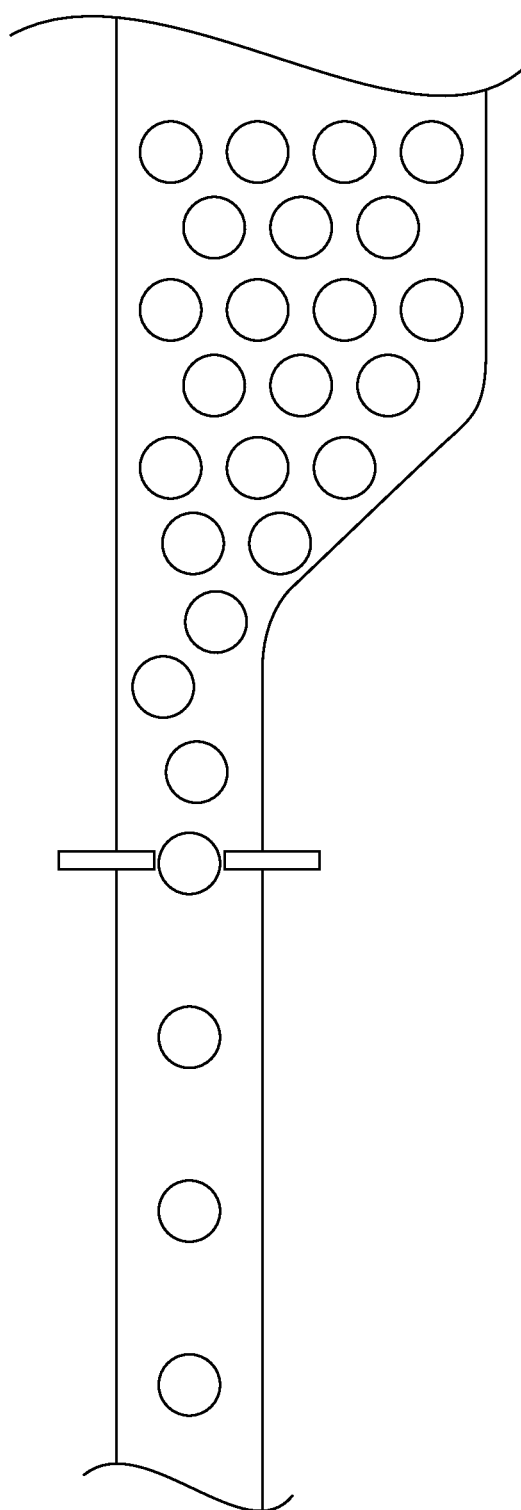

In some embodiments, the operation may involve selectively permitting target objects to pass through a location such as a choke point on a conveyor line (FIG. 2L). In this case, one or more actuators may be inflated to restrict objects from passing. Objects may stack up behind the inflated actuators, which may be (fully or partially) deflated and re-inflated at a predetermined timing in order to allow a predetermined number (e.g., one) object past the actuator. By controlling the timing of deflation and inflation, a predetermined distance may be maintained between adjacent objects.

Figure 2M:
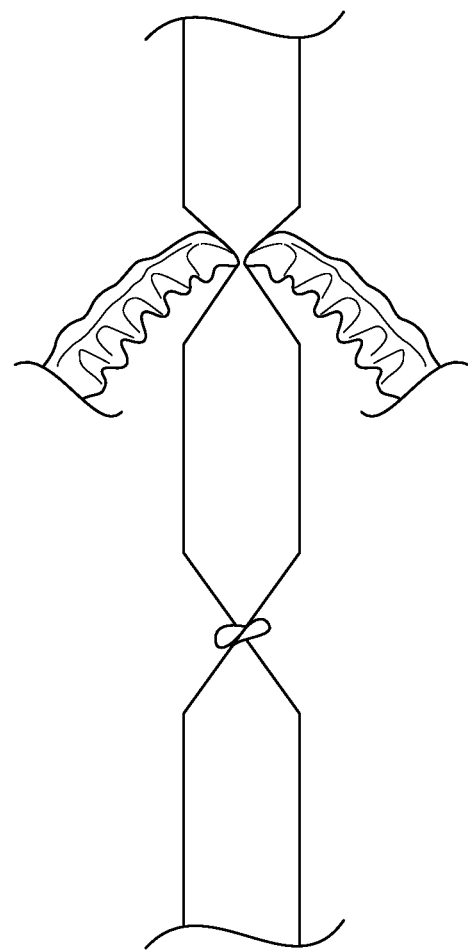

Another example of an operation is a twisting operation, as might be applied to a casing (e.g., for sausage or other stuffed food products). As shown, for example, in FIG. 2M, one or more soft actuators may pinch the casing at a predetermined location and the casing may optionally undergo an initial twist. The actuators may then hold the casing while it is optionally filled or stuffed. The casing may then be twisted to secure the bottom (in FIG. 2M) of the casing.

For applications such as those depicted in FIGS. 2A-2F, the soft robotic actuators may be mounted on a base 222 that supplies inflation fluid to the actuators and/or allows the actuators to be repositioned. In another example, as shown in FIG. 2G, soft actuators 100 may be mounted via their bases 222 to a fixturing table 224 for holding an item to be welded, assembled, filled, or processed. The actuators may be configured to curl around a piece to be held, thereby securing the piece while operations are performed on it.

The fixturing table 224 may optionally include a series of holes 226 or punch-outs for receiving actuators 100. In this way, the actuators 100 may be dynamically re-positioned to accommodate a different item to be worked upon. The fixturing actuators 100 may also be repositioned using a pneumatic, electromechanical, or mechanical system (such as a ball drive or pneumatic linear actuator) enabling the spacing and configuration of the fixturing soft actuators 100 on the table 224 to be automatically adjusted to accommodate items of different shape, size, and weight.

Figure 3:
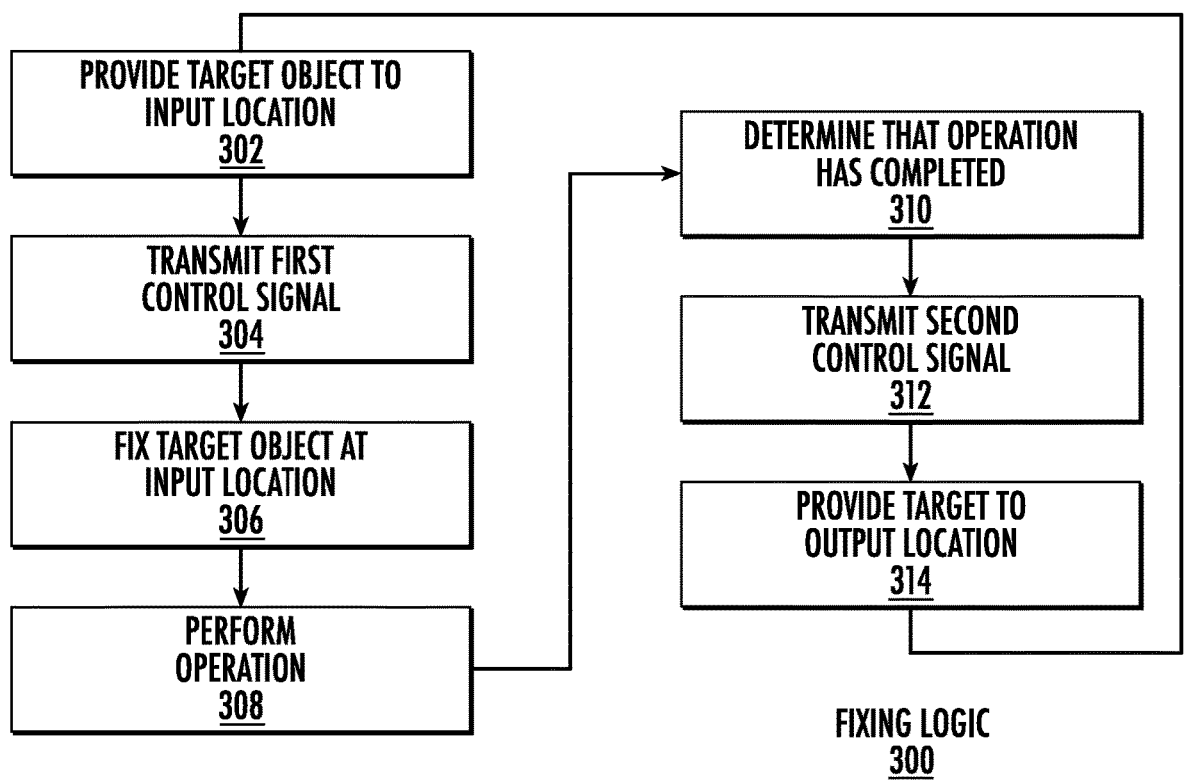
FIG. 3 is a flowchart depicting exemplary logic for performing a method for fixing a target object using a fixturing station.

FIG. 3 is a flowchart depicting exemplary logic 300 for performing a fixturing method according to exemplary embodiments. The logic 300 may be embodied as instructions stored on a non-transitory computer-readable medium that, when executed, causes one or more processors of an electronic device (such as a programmable logic controller) to perform the actions described in FIG. 3. The instructions may be implemented at least partially in hardware. The logic 300 may be performed by a system, such as fixturing station as described above or another suitable system for fixing a target object at a particular location and/or orientation. The logic 300 may be implemented, for example, partially or entirely by transmitting and/or receiving instructions and/or data at a controller associated with the fixturing station.

Although the logic described in FIG. 3 (as well as FIG. 5 and FIG. 6C, below) are described as instructions performed by one or more electronic devices, the logic may also or alternatively be implemented in an analog manner, such as by logic implemented in a hydraulic or pneumatic system.

At block 302, the system may provide a target object to an input location. The input location may be a location at which an operation is performed (see block 308), and may be proximal to at least one soft robotic actuator. The soft robotic actuator may include an elastomeric body with a reservoir configured to be inflated by supplying an inflation fluid to the reservoir (e.g., via an inflation fluid supply line due to operation of a compressor, valve, piston, actuator, or the like).

The target object may be any object suitable for fixing at the target location. Among other possibilities, the target object may be a bottle, produce, or a receptacle for receiving a plurality of objects.

At block 304, the system may transmit a first control signal. For example, the first control signal may be received at a controller associated with the soft robotic actuator. The first control signal may include a first command to inflate the soft robotic actuator. In response to the first command, the system may cause inflation fluid to be provided to the soft robotic actuator, such as by operating a compressor, piston, and/or valve for supplying the inflation fluid to the reservoir.

As a result of supplying the inflation fluid, the actuator may be actuated and, at block 306, the target object may be fixed at the input location. According to some embodiments, the input location may include two or more soft robotic actuators that, when actuated, pin the target object between themselves. In other embodiments, one or more soft robotic actuators may pin the target object between themselves and a relatively non-compliant object, such as a metal or plastic plate.

Optionally, at block 306, the fixed object may be reoriented to be placed into a predetermined target configuration. For example, the object may be delivered in a first, known configuration that is not the same as the predetermined target configuration. The soft robotic actuators may be translated, rotated, and/or inflated to a predetermined degree to reconfigure the target object into the predetermined target configuration. In other embodiments, one or more sensors may detect the first configuration of the object, and reconfiguration logic on the controller may determine how to rotate, translate, etc. the object in order to move from the first configuration to the predetermined target configuration.

When the target object is fixed at the predetermined target location and/or predetermined target configuration, at block 308 the system may perform an operation on the target object. The operation may include any suitable operation that may be performed on the target object. In some embodiments, the same operation may be performed consistently at the fixturing station, whereas in other embodiments the target operation may vary for different target objects received at the fixturing station. In some cases, multiple operations may be performed, in serial or in parallel, at the fixturing station.

For example, if the target object is a bottle, the operation may involve filling the bottle, labeling the bottle, washing the bottle, capping the bottle, scanning a barcode on the bottle, inspecting a print quality on the bottle's label, determining whether the bottle is filled with a predetermined amount of fluid, and/or measuring/identifying the contents of the bottle. If the target object is an article of produce, the operation may include slicing the produce at a predetermined location. Any target may also or alternatively be inspected and/or repaired while fixed in place.

In some embodiments, the target object may be a first receptacle and the target operation may involve placing one or more objects to be packaged into the first receptacle. The first receptacle may be provided in a first configuration, and the soft robotic actuator may support the first receptacle in the first configuration.

In these embodiments, the block 302 may further involve providing a second receptacle in a second configuration different than the first configuration to the input location. Block 306 may further involve fixing the second receptacle in place using the same soft robotic actuator as was used to fix the first receptacle. A second operation may then be performed on the second receptacle in block 308.

For example, the first receptacle may be a 4×3 tray for receiving objects such as apples. Subsequently, a new type of receptacle may be received at the fixturing station, such as a tray in a 6×2 configuration. Using the embodiments described above, the different receptacles may be supported at the fixturing station without the need to reconfigure the supporting actuators. Such a technique may be contrasted with more conventional packaging stations, where a reconfiguration of the receptacle may require that the entire packaging line be reconfigured to support the new configuration.

At block 310, the system may determine that the operation has ended. For example, some operations (e.g., washing a bottle, capping a bottle) involve predetermined movements and/or take place for a predetermined amount of time. When it is detected that the final predetermined movement of the operation has occurred, or that the predetermined amount of time has elapsed, the operation may be determined to have been completed. The completion of other types of operations may be determined using one or more sensors that detect when one or more characteristics of the target object have changed to predetermined target characteristics.

In some embodiments, after the operation has ended, the target object may be inspected downstream of the fixing location. A redirector or other device may reject defective objects for which the operation was not successful. In other embodiments, inspection may occur at the fixing station, potentially as part of step 310.

At block 312, the system may transmit a second control signal to the controller. The second control signal may include a second command to deflate the soft robotic actuator. For example, one or more valves may be opened to allow the inflation fluid to be evacuated from the reservoir of the soft robotic actuator. In some embodiments, a vacuum may be applied to remove the inflation fluid from the reservoir.

Upon deflation, the target object may be provided to an output location at block 314. For example, if the target object is provided on a conveyor belt or other type of assembly line, the target object may continue to move down the belt/line. In other embodiments, the target object may be removed to an output location (such as a receptacle, bin, box, etc.) by a robotic arm. The robotic arm may be a different arm than an arm supporting the actuators used to fix the target object at block 306. In some embodiments, the robotic arm may be the same as the arm used to fix the target object, in which case the second control signal transmitted at block 312 may be transmitted after the object is provided to the target location at block 314.

Processing may then return to block 302 and the system may process the next incoming target object.

Exemplary Methods and Systems for Positioning Target Objects at a Predetermined Location Using Soft Robotic Actuators Further exemplary embodiments, which may be used separately or in conjunction with the embodiments described above, provide techniques and apparatuses for positioning a target object. As used herein, positioning an object refers to moving or reorienting the object so that the object is provided at a predetermined target location and/or in a predetermined target orientation. The target object may or may not be secured (i.e., fixed at the predetermined location), and an operation may or may not be performed on the target object while the target objet is at the predetermined target location and/or the predetermined target orientation.

For example, it is common in operations such as food processing to need to position and orient a piece of food or an assembly of food (e.g. a cake or sandwich) to a specific location on a conveyor belt, such as in the center of the belt. For example, one might need to position a head of lettuce on a conveyer so that they are in the center of a conveyor belt with each stem facing the same direction so the lettuce is fed correctly into a machine that trims the head and stem of the lettuce or de-cores the lettuce.

Conventionally, the job of positioning and orienting items is performed by human operators. However, due to the aforementioned properties of soft robotic actuators (see "Background on Soft Robotic Grippers," above), soft robotic actuators are well-suited to handling delicate items and adapting to items of different shapes or sizes.

Figure 4A:
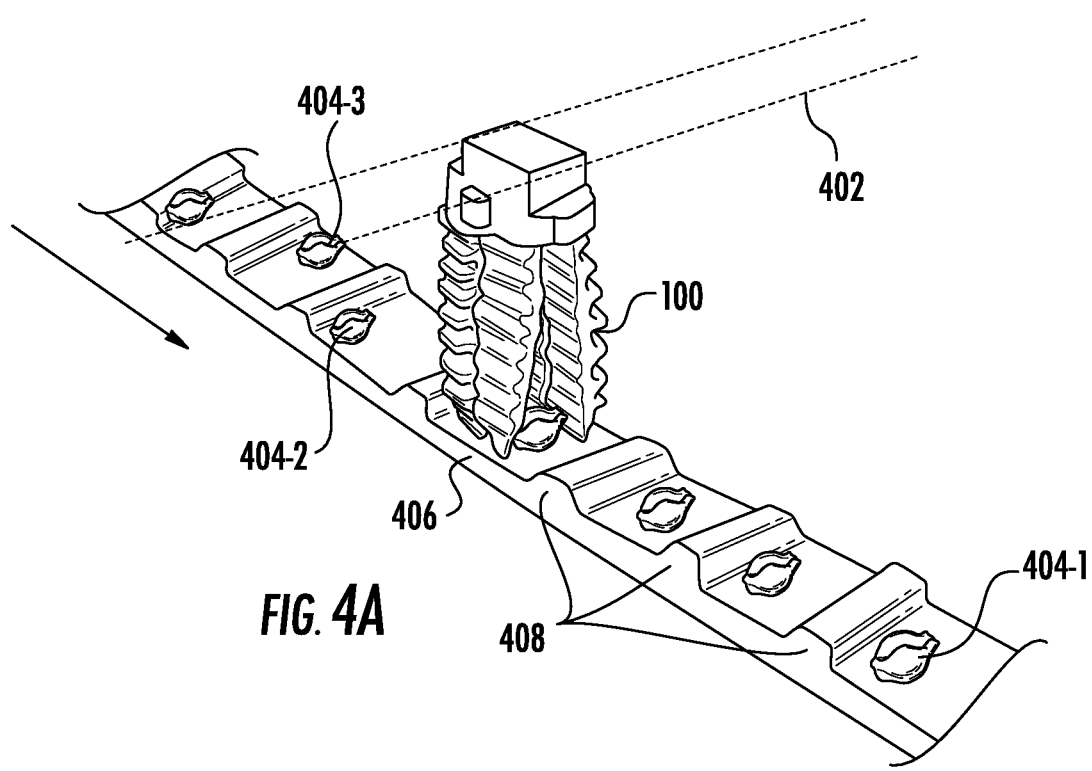
FIGS. 4A-4E depict various examples of object positioning stations according to exemplary embodiments.
Figure 4B:
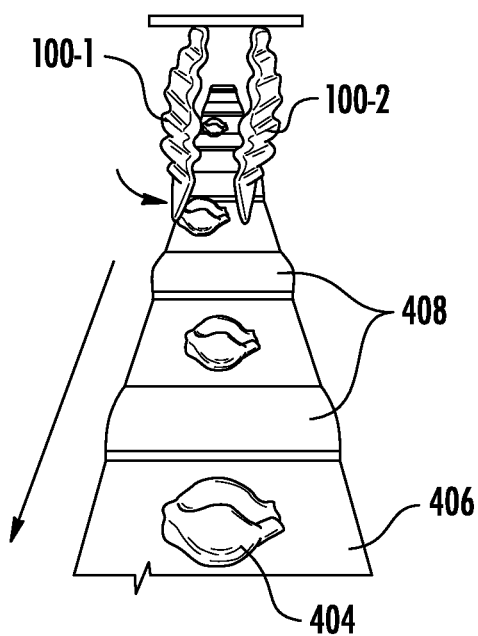
Figure 4C:
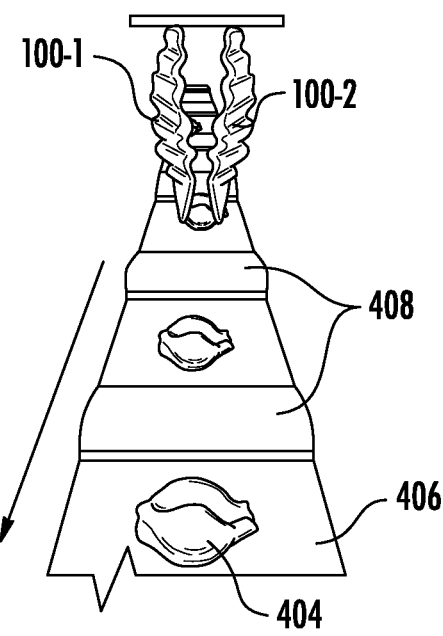

In the example depicted in FIGS. 4A-4C, a set of statically-positioned soft actuators 100 are accurately positioning target objects 404-i (in this example, Brussels sprouts) on a conveyor belt 406 moving in a direction as indicated by the marked arrow. As an alternative to statically-positioned actuators 100, the actuators 100 may be mounted on a hub that is movable with respect to the conveyor belt, e.g. on a set of rails 402, an overhead conveyor, a rotating mount, etc.

The location at which the actuators 100 manipulate a target object is referred to herein as an input location. Upstream of the input location on the conveyor 406 may be target objects that are in a disorganized configuration. In the disorganized configuration, the target objects may or may not be provide at a target location on the conveyor belt 406 and/or in a target orientation.

In this example, upstream of the input location are disorganized sprouts being fed towards a soft actuator positioning station. One or more actuators 100 at the positioning station may be inflated to reposition and/or reorient the target objects 404-i. For example, the target objects 404-i may be fully gripped by the actuators 100 and moved to a new location, or the actuators 100 may be inflated and/or deflated individually or in groups to nudge or otherwise reposition items.

For example, FIG. 4B depicts a situation in which a target object (indicated by the curved arrow) is initially positioned to the side of the conveyor belt (to the left, in the image). This object may be moved towards a central location through the action of a left-side actuator 100-1. In this example, the left-side actuator 100-1 may optionally be negatively inflated (e.g., by applying vacuum) before the target object arrives at the input location (moving the left-side actuator 100-1 further to the left to avoid contacting the approaching target object). The left-side actuator 100-1 may then be inflated to move the actuator 100-1 back towards the center, thereby nudging the target object towards the center of the conveyor 406. In this example, it may not be necessary to utilize a right-side actuator 100-2 to move the target object. Nonetheless, the right-side actuator 100-2 may act as a stop so that the target object does not move beyond the gripping surface of the right-side actuator 100-2. Accordingly, in some embodiments, the right-side actuator 100-2 may be partially or fully inflated to prevent the target object from moving too far past center. As a result, the target object may become centered on the belt 406, as shown in FIG. 4C.

After passing through the soft actuator positioning station, each sprout is centered on the conveyor belt 406 on the downstream side (an output location) where the sprouts are moving outbound away from the soft actuators 100.

In some embodiments, items 404-i on the conveyor belt 406 may be re-oriented in addition to, or alternatively from, positioning the item 404-i. In order to re-orient an item 404-i, a sensor may detect an initial orientation of the item, and computer-implemented logic may determine how to turn the item in order to achieve a desired orientation. One or more actuators 100 may be deployed to grasp or push/pull the item 404-i at certain locations. The actuators may, individually or in combination with a rotating base upon which the actuators are mounted, re-orient the item 404-i to its desired orientation (e.g., by rotating the item).

Although these and other embodiments described herein are depicted handling food objects, it is understood that these embodiments may be applied in other contexts as well, such as general manufacturing, assembling, picking, etc. For example, this same behavior can apply to manufacturing lines where parts are positioned, oriented or justified along a moving belt or in a stationary location.

In other embodiments, the actuators 100 may push the item, such as a Brussels sprout or head of lettuce, to a predetermined location or orientation on the conveyor 406, which may or may not be the center of the conveyor. For example, one of the actuators 100 may push the item to one edge of the conveyor belt 406, against a hard surface such as a wall beside the conveyor belt 406. The item may be positioned such that a part of the item designated for cutting (e.g., a stem of the Brussels sprout or the lettuce) may be positioned against the wall. Downstream on the conveyor belt 406, the wall may be replaced with a cutting blade or other implement that cuts the designated part of the item (e.g., removing the stem from the sprout, or cutting away the leaves of the lettuce to allow them to fall freely). Additionally, the actuators 100 may also re-orient the heads of lettuce such that all the stems are facing the same direction after passing through the soft robotic positioning station at the input location.

In the depicted example, two opposing actuators 100-1, 100-2 grasp and position the item on the belt 406. However, other configurations are also possible. In some embodiments, more or fewer actuators 100 may be employed. For instance, a sandwich may be oriented and positioned by a set of four actuators (one for each side of the bread) before being subjected to a cutting device. For example, the cutting device may be a blade, a waterjet cutter, an ultrasonic cutter, etc. Other types of cutting devices are also contemplated.

In another example, a combination of actuators 100 (e.g., six in number) may inflate around a round baked good or wheel of cheese in order to position the item before cutting.

In further embodiments, the belt 406 itself may include soft robotic actuators 100. For instance, the example in FIGS. 4A-4C shows a belt with a series of protrusions 408. These protrusions 408 may be replaced by soft robotic actuators. By, for example, providing an array of linearly extending actuators that actuate in a direction perpendicular to the conveyor 406 direction of travel at different spacings, the distance between adjacent protrusions 408 may be adjusted (by inflating different combinations of actuators) in order to accommodate items of different sizes or shapes. In further embodiments, the actuators mounted in the conveyor belt 406 may grip an object, or a tray or other platform for holding objects (e.g., an egg-carton tray, an apple tray, a tray of multiple fruit or vegetable items, a tray for parts, a ping-pong ball packaging tray, blister pack style packaging, etc.) Accordingly, if the container for an item is redesigned (e.g., the apple tray's dimensions are altered), the actuators can quickly adapt to the new size or shape, obviating the need to completely redesign the conveyor belt 406 system and/or other parts of the manufacturing line.

Still further, the protrusions 408 may be inflatable pillows positioned directly against each other such that the conveyor is a 1×n array of inflatable pillows. The pillows may be selectively inflated to create spaces for products; for example, in FIG. 4A, the pillows under the Brussels sprouts may remain uninflated, while pillows adjacent to the locations of the sprouts may be inflated to create a pocket for the sprouts. By inflating different combinations of pillows, the size of the spaces between elevated portions may be adjusted to hold objects of different sizes.

In other embodiments these belts 406 may contain molded pockets to hold trays or products. These pockets may be replaced by soft robotic actuators. By providing multiple actuators at different spacings, such a configuration allows the dimensions of the pocket to be adjusted (by inflating different combinations of actuators) in order to accommodate items or trays of different sizes or shapes. Accordingly, instead of or in addition to protrusions 408, the actuators may be in the form of inflatable cups that can receive an object.

In further embodiments, the belt 406 may be a flighted belt for lifting items into the air (e.g., in order to drop them into a box or container). The flighted belt 406 may include protrusions 408 made up of soft robotic actuators.

In some cases, products may be piled on the conveyor in each flighted section (defined by the protrusions 408). In some cases, proper positioning or orientation of these items may include a vertical component—for example, the products may need to be stacked to, at most, a predetermined maximum height. If the objects are stacked higher than the maximum height, they might (for example) clog a processing machine or make contact with support structures. According to exemplary embodiments, a soft actuator may be deployed at the predetermined maximum height.

The actuators may be inflated with a predetermined amount of inflation fluid (or to a predetermined pressure), and the inflow/outflow of the actuators and/or the internal pressure of the actuator may be measured. Upon making contact with an object, the actuator may be deflected and, as a result, inflation fluid may flow out of (or into) the actuator. This flow of inflation fluid may serve as a detector that indicates the presence of objects above the predetermined maximum height. Alternatively, the actuator may include touch sensors, bending sensors, or other types of detection devices for registering contact with an object.

There are a number of advantages to using a soft actuator in such a system, instead of a relatively hard fixture. For example, soft actuators are relatively compliant and will not mark the exterior of a product, thus preventing products from being damaged or marred during processing.

Other embodiments are also contemplated. For example, in one embodiment, soft actuators may be used to grasp delicate food items, such as strawberries or cherries, in order to apply a dipped coating, such as chocolate, to them. In one example, pairs of opposed soft robotic actuators may be mounted to an overhead conveyor belt, which carries the actuators in a "V" pattern (e.g., downhill and then uphill). At the lowest part of the "V" pattern, a pool of fluid, such as chocolate, may be provided. When the items gripped by the actuators reach the low point of the pattern, they may come into contact with the pool and be dipped in the fluid. Similarly, the actuators can be used in manufacturing lines for gripping workpieces and subjecting them to processes such as dyeing, sealing, cleaning, dipping (galvanizing, anodizing, dip soldering etc.) or other coating methods.

Figure 4D:
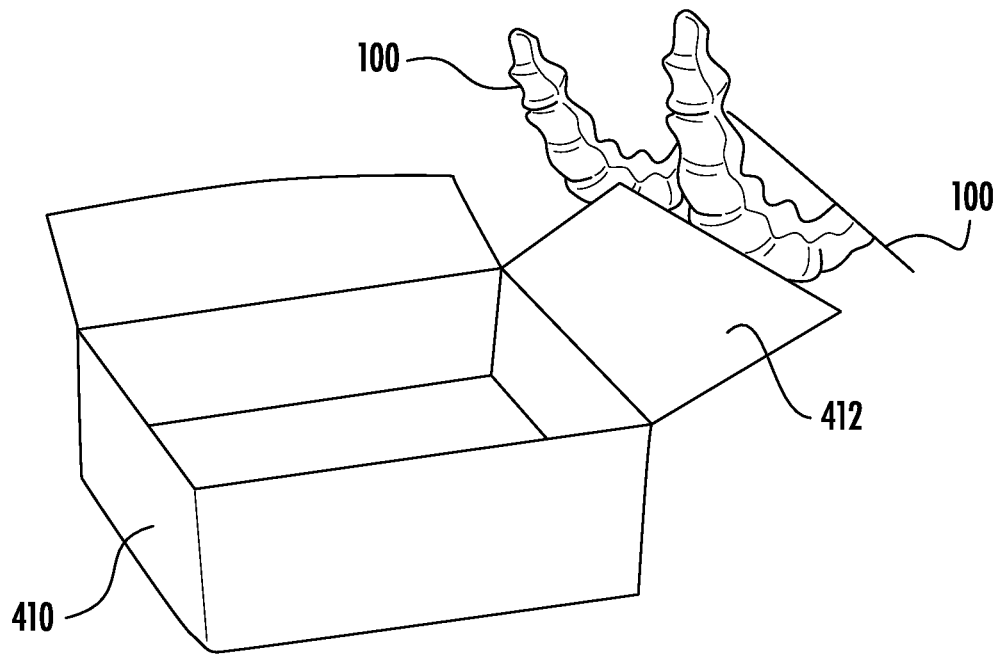
Figure 4E:
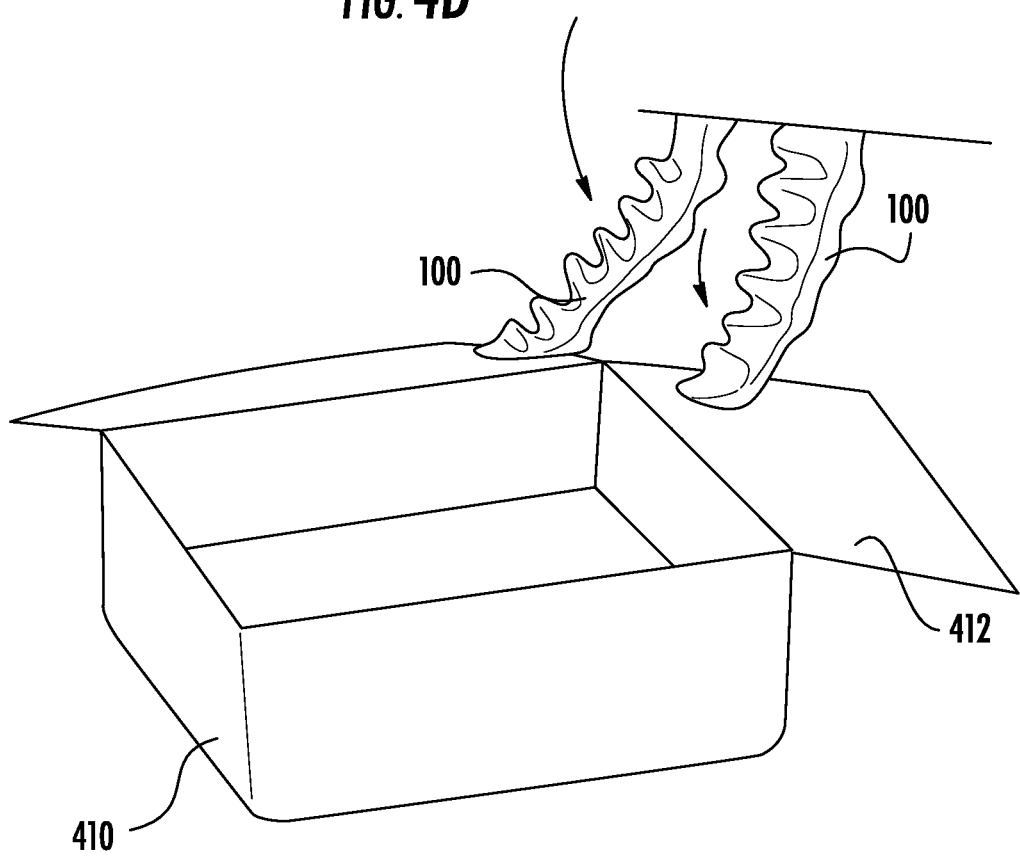

In other examples, portions of an object may be repositioned. For example, FIGS. 4D-4E show a system in which box flaps are held in an open configuration by soft robotic actuators 100.

In manufacturing and packaging, the flaps 412 of boxes 410 can block the action of other machines or loading and unloading of product from the box 410. For example, if a robotic arm is packing a box 410, these flaps 412 can obstruct the path of the robotic arm. In these situations, one conventional solution is to use hard robotic grippers to move the flaps 412 of the box 412 out of the way. This is problematic because such hard actuators are not adaptable; accordingly, they cannot perform this task for many different sizes and shapes of boxes 410 and might need significant reconfiguration to satisfactorily cater to variations in box dimensions.

A soft actuator, by contrast, may hold a wide range of configurations and sizes of boxes 410 open, because at a given pressure the actuators 100 will bend until they collide with an object. Thus, upon inflation a long tentacle-like soft actuator 100 may bend until it strikes and pins a box flap 412 without the use of sensors or reconfiguration even if the position of the box flap 412 varies widely from box size to box size. Moreover, while holding the flap surface, a soft actuator is less likely to mark the surface than a hard actuator. As a result, soft actuators may be particularly well-suited to situations in which marking of product packaging may diminish a customer's perception of the product held by the packaging.

Figure 5:
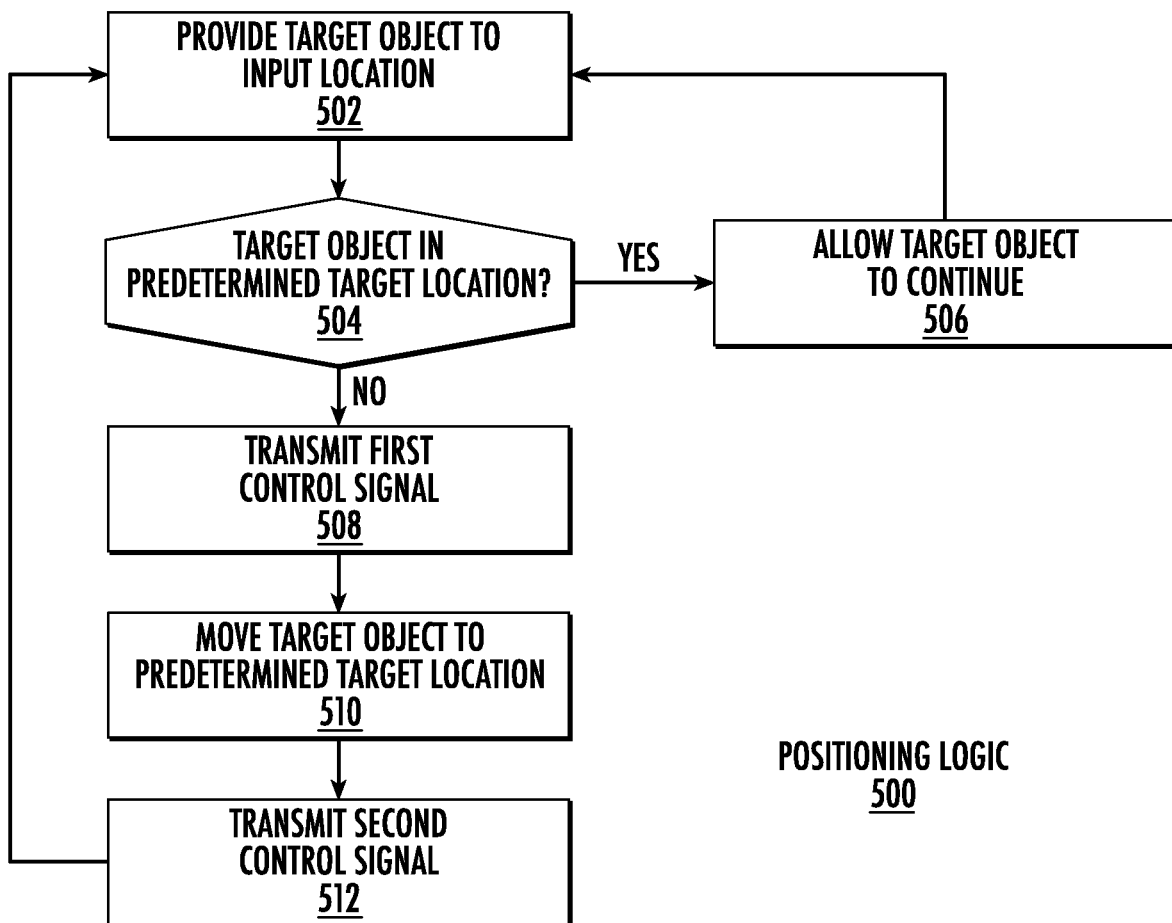
FIG. 5 is a flowchart depicting exemplary logic for performing a method for moving a target object using a moving station.

FIG. 5 is a flowchart depicting exemplary logic 500 for performing a positioning method according to exemplary embodiments. The logic 500 may be embodied as instructions stored on a non-transitory computer-readable medium that, when executed, causes one or more processors of an electronic device to perform the actions described in FIG. 5. The instructions may be implemented at least partially in hardware. The logic 500 may be performed by a system, such as positioning station as described above or another suitable system for positioning a target object at a particular location and/or orientation. The logic 500 may be implemented, for example, partially or entirely by transmitting and/or receiving instructions and/or data at a controller associated with the positioning station.

At block 502, a target object may be provided to an input location. Block 502 may generally correspond to block 302 in FIG. 3, with suitable modifications depending on the particular configuration of the positioning station.

At block 504, the system may optionally determine if the target object at the input location is already in a predetermined target location (and/or in a predetermined configuration). The predetermined target location and/or configuration may be relative to another object, such as a conveyor belt (e.g., the predetermined target location may be at the center or on the side of the conveyor belt, and the predetermined configuration may require that the object be oriented so that a particular side or face of the object faces a particular portion of the conveyor belt or surrounding environment). For example, the system may sense the target object using a sensor (e.g., a camera) and may use the sensor data to determine a location of the object. The thus-determined location may be compared to a predetermined location to identify if the current location of the object matches the predetermined location. If the current location does not match the predetermined location, a difference in one or more dimensions from the current location to the predetermined location may be calculated.

Alternatively, the below operations (beginning at block 508) may be automatically triggered without determining, or without regard to, whether the target object is at the predetermined target location. For example, the soft robotic actuator may be triggered to deploy at a predetermining timing or upon detecting the presence of an object (regardless of location), and the soft robotic actuator may be arranged in a configuration that automatically moves the target object to the predetermined location (or maintains it at the predetermined location, if the object was already properly positioned).

If the determination at block 504 is "yes" (i.e., the target object is already provided at the predetermined location and/or orientation), then at block 506 the target object may be permitted to continue past the input location without action by a soft robotic actuator. Processing may then return to block 502 and the system may proceed to process the next incoming target object.

On the other hand, if the determination at block 504 is "no" (i.e., the target object is not provided at the predetermined location and/or orientation), then at block 508 the system may transmit a first control signal. The first control signal may include a first command to inflate the soft robotic actuator. The actions performed at block 508 may be similar to those performed at block 304 of FIG. 3. In some embodiments, the actuator be configured and positioned so that, upon actuation, the target object is automatically moved to the predetermined target location/orientation without regard to the original position/orientation of the target object. In other embodiments, finer control may be utilized depending on the above-determined initial position of the target object. For example, the first control signal may include an instruction to initially negatively inflate the actuator to move the actuator out of the way of an incoming target object, and/or may include a particular inflation profile describing when and to what extent inflation fluid should be provided to the actuator. By executing the inflation profile and supplying a targeted amount of inflation fluid at calculated timings, the target object may be moved to a predetermined location with fine control (potentially along a path specified by the inflation profile).

At block 510, the system may move the target object to the predetermined target location using the soft robotic actuator. For example, the target object may be moved, by the inflation of the actuator, to the side or center of a conveyor belt. In another embodiment, the target object may be a flap of a box, and the actuator may hold the flap in a configuration that allows a clear path to an opening of the box.

At block 512, the system may transmit a second control signal causing the actuator to be deflated, and the object may be provided to an output location (see blocks 312-314 of FIG. 3). Processing may then return to block 502, and the system may process the next incoming target object.

Exemplary Methods and Systems for Diverting Target Objects to a Diversion Location Using Soft Robotic Actuators Further exemplary embodiments, which may be used separately or in conjunction with the embodiments described above, provide techniques and apparatuses for diverting a target object. As used herein, diverting an object refers to pushing, redirecting, or otherwise moving the object so that the object follows a new path different than an original path the object followed and/or is provided to a new location different than an original location that the object would have been provided to without diversion. Diverting the object may optionally involve reorienting the object as described above.

For example, FIG. 6A depicts one embodiment of a diverting station. In this example, a soft actuator 100 is used to selectively redirect certain objects (such as those that do not pass a visual quality inspection by an automated system) out of the product flow of a conveyor 604. Here, input objects 602 move from left-to-right (in the image) on a two-tiered conveyor belt system. Objects 602 on an upper conveyor pass 604 by a visual inspection camera 606 with computer vision for identification. If the object 602 is a desired or non-defective product 612, it is allowed to fall on to the lower conveyor 610 and travel along uninterrupted. If the object is recognized by the computer vision system as an undesirable or defective object 608, a soft actuator 100 may strike the object as it falls from the upper 604 to the lower conveyor 610 and thereby redirect it towards a receptacle 610 for collection. Using a soft actuator 610 as a redirector ensures that delicate products are not damaged in the process and that a wide array of objects can be redirected with a single tool.

FIG. 6B depicts a second example of a diverting station in which different product types are sorted. Here, a vision system 606 is used to identify if an object is one of two different product types 614, 616. Products of a first type 616 are permitted to continue traveling along a first conveyor 618. At a point downstream of the vision system 606 on the conveyor 618, a soft actuator 100 may redirect products of a second type 614 onto a second conveyor 620.

Figure 6C:
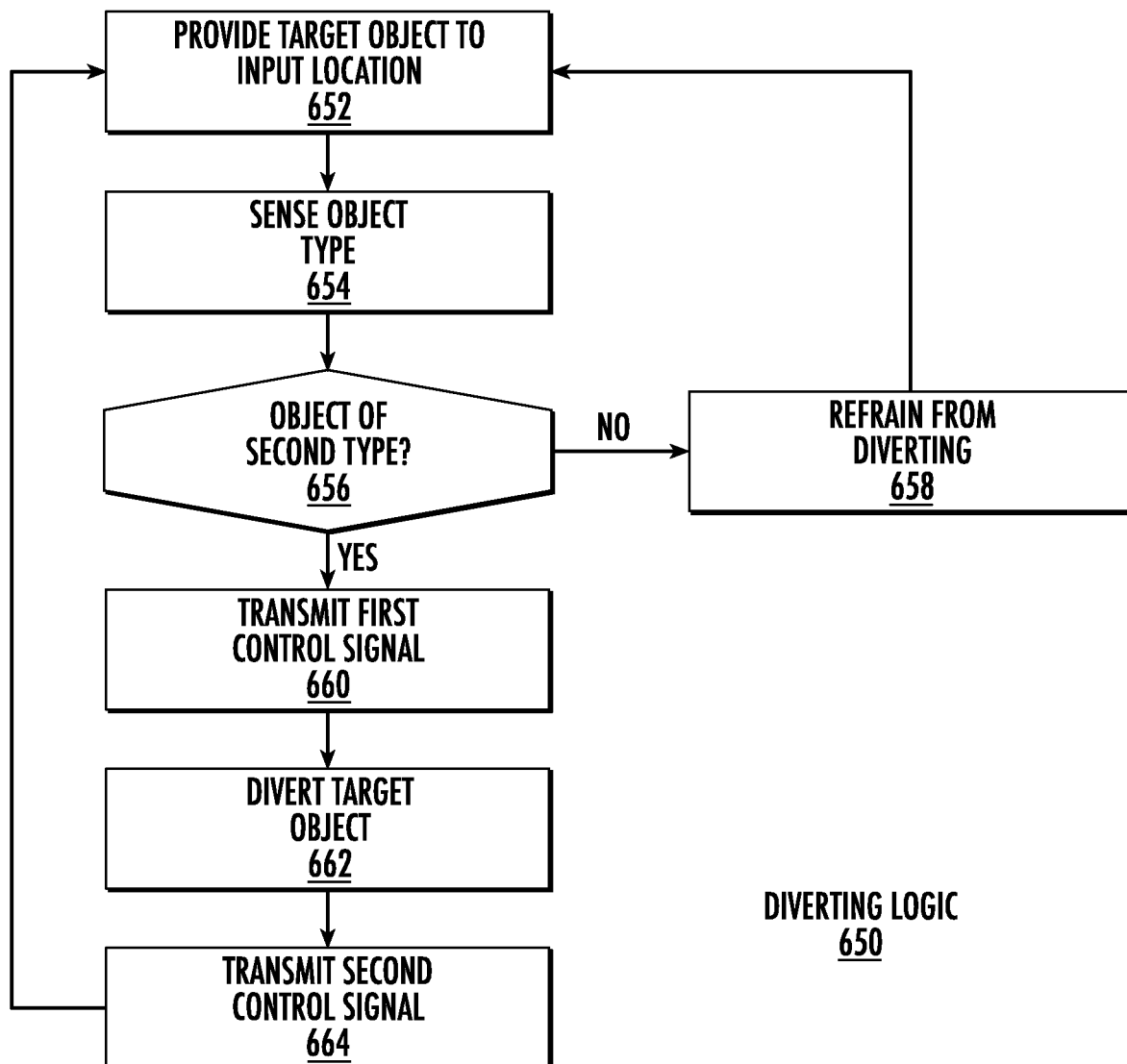
FIG. 6C is a flowchart depicting exemplary logic for performing a method for diverting a target object using a diverting station.

FIG. 6C is a flowchart depicting exemplary logic 650 for performing a diverting method according to exemplary embodiments. The logic 650 may be embodied as instructions stored on a non-transitory computer-readable medium that, when executed, causes one or more processors of an electronic device to perform the actions described in FIG. 6C. The instructions may be implemented at least partially in hardware. The logic 650 may be performed by a system, such as diverting station as described above or another suitable system for diverting a target object to a diversion location. The logic 650 may be implemented, for example, partially or entirely by transmitting and/or receiving instructions and/or data at a controller associated with the diverting station.

At block 652, a target object may be provided to an input location. Block 502 may generally correspond to block 302 in FIG. 3, with suitable modifications depending on the particular configuration of the diversion station. In some embodiments, the input location may be a location of a sensor, such as a vision system, which may be upstream from a soft robotic actuator. In this case, the target object may move to the input location, may be scanned, and then may move to the location of the actuator.

At block 654, the system may sense an object type of the object. For example, a sensor, such as a camera, may image the target object. Computer vision and/or image analysis may be applied to identify one or more characteristics of the target object.

At block 656, the system may determine, based on the sensing at block 654, if the target object is of a first type or a second type. For example, the first type may be a normal type and second type may be a defective type. Alternatively or in addition, the first type may have a characteristic having a first value (e.g., an object shape or color) and the second type may have a characteristic having a second value different than the first value (e.g., a different shape or color).

If the determination at block 656 is "no" (i.e., the object is of a first type instead of the second type), then at block 658, the system may refrain from diverting the target object of the first type from its initial path. This may involve, for example, allowing the target object to continue along an original conveyor belt, or allowing the target object to fall, undiverted, from an upper conveyor belt to a lower conveyor belt.

Processing may then return to block 652, and the system may process the next target object received at the input location.

On the other hand, if the determination at block 656 is "yes" (i.e., the object is of the second type), then at block 660, the system may transmit a first control signal. The first control signal may include a first command to inflate the soft robotic actuator. The actions performed at block 660 may be similar to those performed at block 304 of FIG. 3. In some embodiments, the actuator be configured and positioned so that, upon actuation, the target object is diverted from a first location to a diversion location at block 662.

Diverting the target object may include providing the target object to a diversion location accessible to the soft robotic actuator, and inflating the soft robotic actuator in response to the control signal transmitted at block 660. For example, the diverting location may be a receptacle, or a second conveyor belt different than a first conveyor belt at the input location.

At block 664, the system may transmit a second control signal causing the actuator to be deflated, and the object may be provided to an output location (see blocks 312-314 of FIG. 3). Processing may then return to block 652, and the system may process the next target object received at the input location.

III. Computing System and Network Implementation

Figure 7:
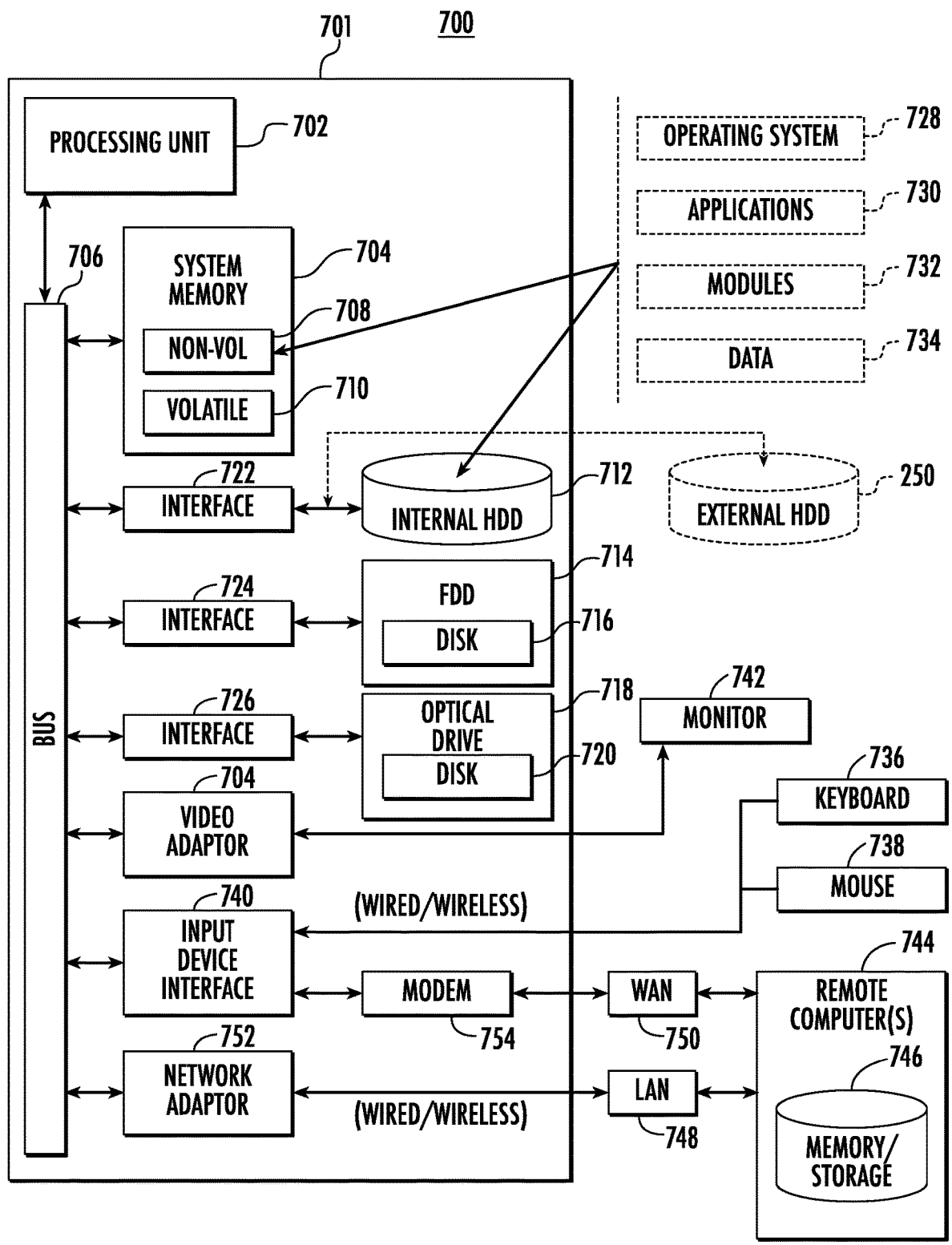
FIG. 7 depicts an electronic device suitable for use in exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the communication system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
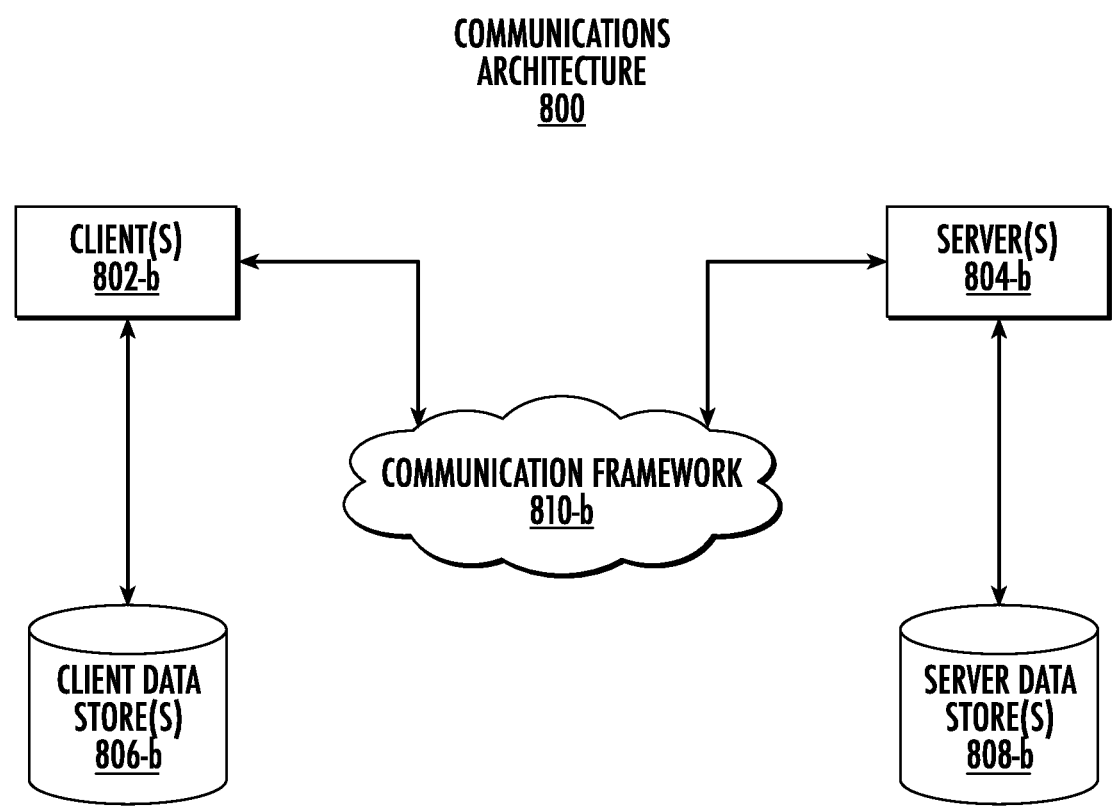
FIG. 8 depicts an exemplary network architecture suitable for use with exemplary embodiments.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

CONCLUSION

Any or all of the above-described techniques may be implemented by suitable logic stored on a non-transitory computer-readable medium. When executed by one or more processors, the logic may cause the processors to perform the techniques identified above. The logic may be implemented fully or partially in hardware. The logic may be included as part of a controller for controlling the actuation, de-actuation, movement, position, etc. of a soft robotic actuator and/or a soft robotic system employing one or more actuators in a gripper arrangement.

The invention claimed is:

1. A method comprising:
sensing a target object at an input location with a sensor;
determining if the target object is of a first type or a second type; and
diverting the target object to a diversion location if the target object is of the second type, the diverting comprising:
providing the target object to a diversion location downstream of the sensor and accessible to a soft robotic actuator, the soft robotic actuator comprising an elastomeric body having a reservoir, and configured to be in a neutral state and to transition to an inflated state by supplying an inflation fluid to the reservoir, wherein the actuator curls in a circumferential direction during the transition and is positioned so that in the neutral state the soft robotic actuator is removed from a path of the target object at the diversion location and in the inflated state at least a distal tip of the soft robotic actuator curls into the path to divert the target object at the diversion location, and
transmitting a control signal to a controller associated with the soft robotic actuator, the control signal comprising a command to transition the soft robotic actuator from the neutral state to the inflated state; or
refraining from diverting the target object to the diversion location if the target object is of the first type.

2. The method of claim 1, wherein the first type is a normal type and second type is a defective type.

3. The method of claim 1, wherein the first type has a characteristic having a first value and second type has a characteristic having a second value different than the first value.

4. The method of claim 1, wherein the diversion location is a receptacle.

5. The method of claim 1, wherein the input location is a first conveyor belt, and the diversion location is a second conveyor belt.

6. The method of claim 1, wherein the input location is a first conveyor belt, and refraining from diverting comprises allowing the target object to continue on the first conveyor belt.

7. The method of claim 1, wherein the input location is a first conveyor belt, and refraining from diverting comprises allowing the target object to continue to a second conveyor belt.

8. The method of claim 1, wherein sensing the target object comprises scanning the target object with one or more of a visual spectrum camera, an x-ray imaging system, a hyper spectral camera, a 3D scanner, a spectrometer, or a barcode scanner.

9. An apparatus comprising:
a sensor configured to sense a target object at an input location; and
a hardware controller configured to:
determine if the target object is of a first type or a second type; and
divert the target object to a diversion location if the target object is of the second type, the diverting comprising:
providing the target object to a diversion location downstream of the sensor and accessible to a soft robotic actuator, the soft robotic actuator comprising an elastomeric body having a reservoir, and configured to be in a neutral state and to transition to an inflated state by supplying an inflation fluid to the reservoir, wherein the actuator curls in a circumferential direction during the transition and is positioned so that in the neutral state the soft robotic actuator is removed from a path of the target object at the diversion location and in the inflated state at least a distal tip of the soft robotic actuator curls into the path to divert the target object at the diversion location, and
transmitting a control signal to a controller associated with the soft robotic actuator, the control signal comprising a command to transition the soft robotic actuator from the neutral state to the inflated state; or
refrain from diverting the target object to the diversion location if the target object is of the first type.

10. The apparatus of claim 9, wherein the first type is a normal type and second type is a defective type.

11. The apparatus of claim 9, wherein the first type has a characteristic having a first value and second type has a characteristic having a second value different than the first value.

12. The apparatus of claim 9, wherein the diversion location is a receptacle.

13. The apparatus of claim 9, wherein the input location is a first conveyor belt, and the diversion location is a second conveyor belt.

14. The apparatus of claim 9, wherein the input location is a first conveyor belt, and refraining from diverting comprises allowing the target object to continue on the first conveyor belt.

15. The apparatus of claim 9, wherein the input location is a first conveyor belt, and refraining from diverting comprises allowing the target object to continue to a second conveyor belt.

16. The apparatus of claim 9, wherein sensing the target object comprises scanning the target object with one or more of a visual spectrum camera, an x-ray imaging system, a hyper spectral camera, a 3D scanner, a spectrometer, or a barcode scanner.

* * * * *

UNITED STATES PATENT AND TRADEMARK OFFICE
CERTIFICATE OF CORRECTION

| | |
|---|---|
| PATENT NO. | : 11,286,144 B2 |
| APPLICATION NO. | : 16/795762 |
| DATED | : March 29, 2022 |
| INVENTOR(S) | : Joshua Lessing et al. |

It is certified that error appears in the above-identified patent and that said Letters Patent is hereby corrected as shown below:

On the Title Page

Column 1, item (73): Assignee, replace "SOFT ROBOTICS, INC., Boston, MA (US)" with --SOFT ROBOTICS, INC., Cambridge, MA (US)--

Signed and Sealed this
Nineteenth Day of December, 2023

*Katherine Kelly Vidal*

Katherine Kelly Vidal
*Director of the United States Patent and Trademark Office*